(12) United States Patent
Malik

(10) Patent No.: US 11,661,533 B2
(45) Date of Patent: May 30, 2023

(54) PRESSURE SENSITIVE ADHESIVES AND ARTICLES WITH HYPERBRANCHED SILSESQUIOXANE CORE AND METHODS OF MAKING THE SAME

(71) Applicant: Avery Dennison Corporation, Glendale, CA (US)

(72) Inventor: Ranjit Malik, Port Matilda, PA (US)

(73) Assignee: Avery Dennison Corporation, Mentor, OH (US)

( * ) Notice: Subject to any disclaimer, the term of this patent is extended or adjusted under 35 U.S.C. 154(b) by 169 days.

(21) Appl. No.: 16/043,541

(22) Filed: Jul. 24, 2018

(65) Prior Publication Data

US 2019/0031924 A1     Jan. 31, 2019

Related U.S. Application Data

(60) Provisional application No. 62/538,512, filed on Jul. 28, 2017.

(51) Int. Cl.
| | | |
|---|---|---|
| *C08L 83/10* | (2006.01) | |
| *C09J 7/38* | (2018.01) | |
| *C09J 183/10* | (2006.01) | |
| *C08G 83/00* | (2006.01) | |
| *C08G 77/442* | (2006.01) | |

(52) U.S. Cl.
CPC ............ *C09J 7/385* (2018.01); *C08G 83/005* (2013.01); *C09J 183/10* (2013.01); *C08G 77/442* (2013.01); *C08L 83/10* (2013.01); *C09J 2433/00* (2013.01)

(58) Field of Classification Search
CPC .......... C08L 33/08; C08L 33/10; C08L 33/12; C08L 43/04; C09J 133/08; C09J 133/10; C09J 133/12; C09J 143/04
See application file for complete search history.

(56) References Cited

U.S. PATENT DOCUMENTS

| | | | | |
|---|---|---|---|---|
| 4,987,178 A | * | 1/1991 | Shibata ................ | C09D 5/4492 |
| | | | | 524/547 |
| 5,254,619 A | * | 10/1993 | Ando ...................... | C08L 43/04 |
| | | | | 524/504 |
| 6,274,688 B1 | * | 8/2001 | Nakagawa ................ | C08F 2/38 |
| | | | | 526/328 |
| 7,129,294 B2 | * | 10/2006 | Nakagawa ................ | C08F 2/38 |
| | | | | 525/100 |

(Continued)

FOREIGN PATENT DOCUMENTS

| | | |
|---|---|---|
| CN | 104861098 | 1/2017 |
| CN | 106543444 | 3/2017 |

(Continued)

OTHER PUBLICATIONS

Handbook of Pressure Sensitive Adhesive Technology, Von Nostrand Reinhold, Co, Chap. 20, pp. 527-584 (1989).

(Continued)

*Primary Examiner* — Margaret G Moore

(57) ABSTRACT

Pressure sensitive adhesives that include hyperbranched silsesquioxane-core polymers are described. Also described are various methods for producing the noted polymers and pressure sensitive adhesives. In addition, a variety of articles including tapes utilizing the pressure sensitive adhesives are described.

75 Claims, 19 Drawing Sheets

(56) References Cited

U.S. PATENT DOCUMENTS

| | | | |
|---|---|---|---|
| 8,188,180 B2 | 5/2012 | Jonschker et al. | |
| 10,370,564 B2* | 8/2019 | Chatterjee | C09J 4/06 |
| 2005/0107547 A1* | 5/2005 | Ohno | C08F 2/38 |
| | | | 525/329.7 |
| 2007/0004880 A1* | 1/2007 | Nakagawa | C08F 8/34 |
| | | | 526/90 |
| 2007/0275239 A1* | 11/2007 | Hamada | A61L 15/44 |
| | | | 428/355 AC |
| 2008/0317793 A1 | 12/2008 | Blin | |
| 2009/0306307 A1 | 12/2009 | Ahn et al. | |
| 2010/0068168 A1* | 3/2010 | Song | A61L 31/06 |
| | | | 424/78.17 |
| 2010/0120935 A1 | 5/2010 | Jonschker et al. | |
| 2010/0143712 A1* | 6/2010 | Plantenberg | C08G 18/4825 |
| | | | 428/355 CN |
| 2010/0260700 A1 | 10/2010 | Dop | |
| 2010/0285233 A1 | 11/2010 | Brasseur et al. | |
| 2010/0326273 A1* | 12/2010 | Liu | B01D 69/148 |
| | | | 95/45 |
| 2011/0054074 A1 | 3/2011 | Jonschker et al. | |
| 2011/0129683 A1 | 6/2011 | Ahn et al. | |
| 2012/0328829 A1 | 12/2012 | Vang et al. | |
| 2013/0241390 A1* | 9/2013 | Guschl | G02B 1/04 |
| | | | 313/498 |
| 2013/0302394 A1 | 11/2013 | Dumousseaux et al. | |
| 2013/0317183 A1* | 11/2013 | Lewicki | C08G 77/38 |
| | | | 525/477 |
| 2013/0344290 A1 | 12/2013 | Yu et al. | |
| 2014/0151230 A1* | 6/2014 | Aiba | C08G 18/643 |
| | | | 204/505 |
| 2016/0376420 A1* | 12/2016 | Yano | C08L 101/10 |
| | | | 524/297 |
| 2017/0321088 A1* | 11/2017 | Chatterjee | C08F 220/10 |
| 2018/0329679 A1 | 11/2018 | Lenchner et al. | |

FOREIGN PATENT DOCUMENTS

| | | |
|---|---|---|
| CN | 106188573 | 8/2018 |
| WO | 2007/053396 | 5/2007 |
| WO | 2008/085234 | 7/2008 |
| WO | 2009/065873 | 5/2009 |
| WO | 2015/195391 | 12/2015 |

OTHER PUBLICATIONS

Eisenberg et al., "Cagelike Precursors of High-Molar-Mass Silsesquioxanes Formed by the Hydrolytic Condensation of Trialkoxysilanes," Macromolecules, vol. 33, No. 6, pp. 1940-1947, 2000.

International Search Report and Written Opinion dated Oct. 16, 2018 issued in corresponding IA No. PCT/US2018/043401 filed Jul. 24, 2018.

* cited by examiner

PRESSURE SENSITIVE ADHESIVES AND ARTICLES WITH HYPERBRANCHED SILSESQUIOXANE CORE AND METHODS OF MAKING THE SAME

CROSS-REFERENCE TO RELATED APPLICATION

The present application claims the benefit of U.S. Provisional Patent Application No. 62/538,512 filed Jul. 28, 2017, which is incorporated herein by reference in its entirety.

FIELD

The present subject matter relates to methods of preparing pressure sensitive adhesives with novel architecture signified with a hyperbranched shell which surrounds a silsesquioxane core to which it is chemically bound. In many aspects, a precursor unit, acting as a building block, undergoes condensation reaction(s) to form the hyperbranched silsesquioxane. In other aspects, the architecture is controlled at the core level as well as at the shell level. In yet other aspects, the chemical composition of the core is controlled by incorporation of metal atoms in the core to prepare mixed metal cores. In yet other aspects, the architecture of the hyperbranches is controlled by using a blend of various precursors. The present subject matter also relates to the pressure sensitive adhesives formed from the methods. Additionally, the present subject matter relates to tapes and other articles using the pressure sensitive adhesives.

BACKGROUND OF THE INVENTION

Although, a wide range of compositions and practices are known for making (meth)acrylate pressure sensitive adhesives, a common element underlying conventional (meth)acrylate-based PSA essentially consists of linear uncrosslinked chains of polymer with defined modulus and glass transition temperature. The term 'linear' means that the building blocks (monomers) of the polymer are joined end-to-end like links along a chain, resulting in a simple linear structure. The polymer structures are illustrated by the sketch in FIG. 1a for uncrosslinked linear polymer chains. The linear polymer chains of a PSA are often lightly crosslinked during subsequent processing to improve its cohesive strength at the cost of 'peel' strength. It must be emphasized that crosslinked structure is detrimental to PSA performance. Nonetheless, crosslinking is done to balance the physical performance of the PSA. FIGS. 2A and 2B illustrates the structure for crosslinked polymer chains.

Placing reactive groups at both chain ends or having them randomly distributed on a (meth)acrylate polymer chain backbone is a generally practiced crosslinking technique in the art. While crosslinking of linear polymers is a useful technique for a number of PSA applications, both the performance range and the process capability is limited and has reached a ceiling. It must be noted that crosslinking is detrimental to 'tack' and 'peel' performance of PSA and should be avoided as much as possible. However, crosslinking is required to build shear strength, to prevent oozing of adhesive from the wound up roll of tape, and to improve die-cuttability of the adhesive. But all this comes at the cost of other properties. In an ideal PSA world, one strives to achieve high 'shear' but not give up on 'peel' and 'tack' performance. Therefore, a means to eliminate the need for crosslinking can widen the performance window of PSAs.

Accordingly, a need exists to molecularly re-design the architecture of pressure sensitive adhesives in order to expand the useful range of these materials. In this respect, the inventor contemplates leveraging the recent advances in building polymers through 'designed architecture' strategy. It must be noted that controlled architecture is an active area of research in polymer science which has already shown benefits in many fields.

SUMMARY

The difficulties and drawbacks associated with previous approaches are addressed in the present subject matter as follows.

In one aspect, the present subject matter provides a polymer comprising, consisting essentially of, or consisting of a hyperbranched polymer comprising at least one pure silsesquioxane core and at least two polymer chains chemically bound to each of said pure silsesquioxane cores. The pure silsesquioxane cores may be fully condensed cores, partially condensed cores, or a combination of fully condensed cores and partially condensed cores. Each of the said polymer chains of the hyperbranched polymers may be compositionally different polymer chains, compositionally the same polymer chains, or a combination of compositionally different polymer chains and compositionally the same polymer chains. Additionally, the hyperbranched polymers and/or the polymer comprise at least about 50% by weight of (meth)acrylate monomers.

In another aspect, the present subject matter provides a polymer comprising, consisting essentially of, or consisting of a hyperbranched polymer comprising at least one hybrid silsesquioxane core and at least two polymer chains chemically bound to each of said hybrid silsesquioxane cores. The hybrid silsesquioxane cores may be fully condensed cores, partially condensed cores, or a combination of fully condensed cores and partially condensed cores. Each of the said polymer chains of the hyperbranched polymers may be compositionally different polymer chains, compositionally the same polymer chains, or a combination of compositionally different polymer chains and compositionally the same polymer chains. Additionally, the hyperbranched polymers and/or the polymer comprise at least about 50% by weight of (meth)acrylate monomers.

In yet another aspect, the present subject matter provides a polymer comprising, consisting essentially of, or consisting of a hyperbranched polymer comprising a combination of (i) at least one pure silsesquioxane core and at least two polymer chains chemically bound to each of the pure silsesquioxane cores and (ii) at least one hybrid silsesquioxane core and at least two polymer chains chemically bound to each of the hybrid silsesquioxane cores. The pure and/or hybrid silsesquioxane cores may be fully condensed cores, partially condensed cores, or a combination of fully condensed cores and partially condensed cores. Each of the said polymer chains of the hyperbranched polymers may be compositionally different polymer chains, compositionally the same polymer chains, or a combination of compositionally different polymer chains and compositionally the same polymer chains. Additionally, the hyperbranched polymers and/or the polymer comprise at least about 50% by weight of (meth)acrylate monomers.

In yet another aspect, the hybrid silsesquioxane core described herein is a metallo-silsesquioxane core.

In still another aspect, the present subject matter provides a polymer in which a portion of the discrete silsesquioxane cores may be linked together in a pearl chain or in a multidimensional network structure as shown in FIGS. 14A and 14B, respectively.

In yet another aspect, the present subject matter provides a silsesquioxane core comprising Si atoms attached to at least one of three oxo groups and two oxo groups.

In still another aspect, the present subject matter provides a polymer comprising silsesquioxane cores having the general formula $[RSiO_{3/2}]_n$ where n is an even number and R is selected from the group consisting of alkyl, aryl, heterocarbon, polymer, oligomer, (meth)acrylate polymer, (meth)acrylate oligomer, and combinations thereof.

In still another aspect, the present subject matter provides a polymer comprising a majority of the silsesquioxane cores having the general formula $[RSiO_{3/2}]_n$ where n is an even number and R is selected from the group consisting of alkyl, aryl, heterocarbon, polymer, oligomer, (meth)acrylate polymer, (meth)acrylate oligomer, and combinations thereof.

In yet another aspect, the present subject matter provides a polymer comprising silsesquioxane cores having the general formula $[R-SiO_{3/2}]_n(H_2O)_{(3n/2)-x}$ where 'n' is a positive integer, 'x' is a positive integral value less than or equal to $3n/2$, and R is selected from the group consisting of alkyl, aryl, heterocarbon, polymer, oligomer, (meth)acrylate polymer, (meth)acrylate oligomer, and combinations thereof.

In still another aspect, the present subject matter provides a polymer comprising a majority of the silsesquioxane cores having the general formula $[R-SiO_{3/2}]_n(H_2O)_{(3n/2)-x}$ where 'n' is a positive integer, 'x' is a positive integral value less than or equal to $3n/2$, and R is selected from the group consisting of alkyl, aryl, heterocarbon, polymer, oligomer, (meth)acrylate polymer, (meth)acrylate oligomer, and combinations thereof.

In still another aspect, the present subject matter provides a pressure sensitive adhesive comprising the polymer(s) described above.

In another aspect, the present subject matter provides an article comprising, consisting essentially of, or consisting of a pressure sensitive adhesive comprising the polymer(s) described above.

In yet another aspect, the present subject matter provides a pressure sensitive adhesive comprising a hyperbranched polymer, the hyperbranched polymer comprising at least one silsesquioxane core and at least two polymer chains chemically bound to each of said silsesquioxane core, wherein at least one of the hyperbranched polymer and the pressure sensitive adhesive comprises at least about 50% by weight of (meth)acrylate monomers. Additionally, the polymer is free of crosslinking.

In still another aspect, the present subject matter provides a pressure sensitive adhesive consisting of a hyperbranched polymer, the hyperbranched polymer having at least one silsesquioxane core and at least two polymer chains chemically bound to each of said silsesquioxane core, wherein at least one of the hyperbranched polymer and the pressure sensitive adhesive comprises at least about 50% by weight of (meth)acrylate monomers. Additionally, the polymer is free of crosslinking.

In yet another aspect, the present subject matter provides a method of forming a polymer comprising, consisting essentially of, or consisting of a hyperbranched polymer comprising at least one pure silsesquioxane core and at least two polymer chains chemically bound to each of said pure silsesquioxane cores or at least one hybrid silsesquioxane core and at least two polymer chains chemically bound to each of said hybrid silsesquioxane cores, or a combination of (i) at least one pure silsesquioxane core and at least two polymer chains chemically bound to each of the pure silsesquioxane cores and (ii) at least one hybrid silsesquioxane core and at least two polymer chains chemically bound to each of the hybrid silsesquioxane cores. The pure and/or hybrid silsesquioxane cores may be fully condensed cores, partially condensed cores, or a combination of fully condensed cores and partially condensed cores. Each of the said polymer chains of the hyperbranched polymers may be compositionally different polymer chains, compositionally the same polymer chains, or a combination of compositionally different polymer chains and compositionally the same polymer chains. Additionally, the hyperbranched polymers and/or the pressure sensitive adhesive comprises at least about 50% by weight of (meth)acrylate monomers. The method comprises the steps of providing a precursor having a formula $R-Si(X)_{3-a}(Y)_a$ wherein R is one of a nonhydrolyzable organic group, a nonhydrolyzable oligomer chain, and a nonhydrolyzable polymer chain, and X is a hydrolyzable group, Y is an organofunctional group, and the value of "a" is selected from the group consisting of 0, 1, 2, and combinations thereof. The method also comprises subjecting the precursor to both hydrolysis and condensation reactions or to only a condensation reaction to thereby form the hyperbranched polymer.

In still another aspect, the present subject matter provides a pressure sensitive adhesive comprising the polymer formed from the method described above.

The pressure sensitive adhesive(s) described herein exhibit(s) (i) a glass transition temperature (Tg) of from about 10° C. to about −60° C. as determined by differential scanning calorimetry (DSC) and (ii) a plateau shear modulus at 25° C. and 1 radian per second that is between $5\times10^4$ and $6\times10^6$ dynes/cm$^2$ as determined by dynamic mechanical analysis (DMA).

As will be realized, the subject matter described herein is capable of other and different aspects and its several details are capable of modifications in various respects, all without departing from the claimed subject matter. Accordingly, the drawings and description are to be regarded as illustrative and not restrictive.

DETAILED DESCRIPTION OF THE EMBODIMENTS

Of special interest to this present subject matter are hyperbranched (meth)acrylic polymers built on silsesquioxane cores for use in pressure sensitive adhesives without the need for crosslinking.

The hyperbranched polymers of the subject matter described herein are a new class of polymers. They possess unique properties distinguishing them from polymers belonging to linear, branched-linear, and crosslinked classes. Hyperbranched polymers typically exhibit an unusual topological structure, the 'core-shell', characterized by a very high local concentration of chain ends in the peripheral layer (shell) of macromolecules and a very high local concentration of branching points in the core. This topological structure can lead to unique properties. As a result, the hydrodynamic volume stops increasing after a certain degree of branching has been reached and, beyond a certain value of number average molecular weight, $M_n$ (usually starting from $M_n > 10^4$), the growth in hydrodynamic volume becomes significantly less than that of linear macromolecules with the same value $M_n$. Such compact packing of hyperbranched polymers and the large number of free chain ends at the periphery represent the primary structural and physical reasons for the manifestation of the unique properties. In one instance, hyperbranched polymers are amorphous even though their linear counterparts may be crystalline. It is believed that the large number of terminal groups in hyperbranched polymers affect the macromolecular properties, such as the glass transition temperature, solubility, dielectric properties, hydrophobicity, and thermal stability.

Figure 3:
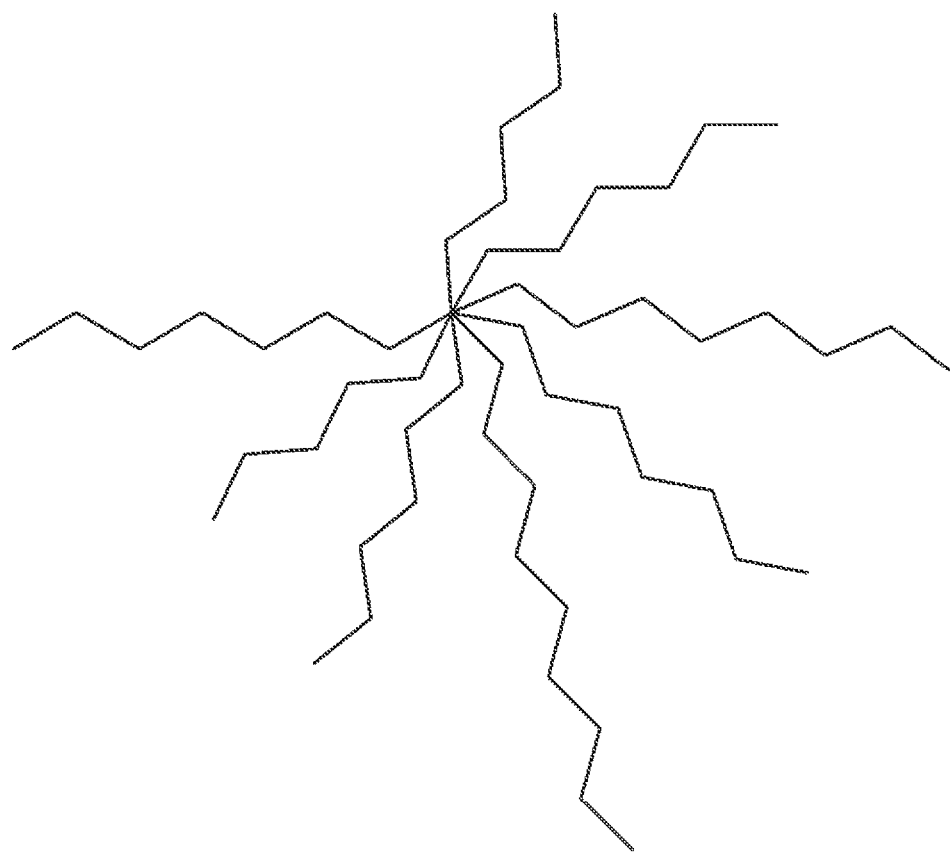
FIG. 3 is a schematic illustration of a hyperbranched polymer structure.

Hyperbranched topology is characterized with a large number of chain ends per macromolecule which is a basis for its special properties. These special structures can be accomplished if only there is a means to covalently tie the polymer chains at one end in to a bundle while allowing the other end of the chain to dangle freely as illustrated in FIG. 3. Two synthetic strategies useful in producing structures like this are, a) grow polymer chains outwards from a central point in a multistep synthesis (divergent approach) or, b) grow individual polymer chains in a first step followed by tying them at one end in a second step (convergent approach). Conventional PSA polymers usually designed for crosslinking will be unsuccessful in executing the strategy for producing hyperbranched topology because such crosslinking would tie up the chains at two or more points instead of having them dangle freely. FIG. 3 shows depiction of a hyperbranched polymer structure-tied at one end to the central core while the other end can move about freely.

Figure 4:
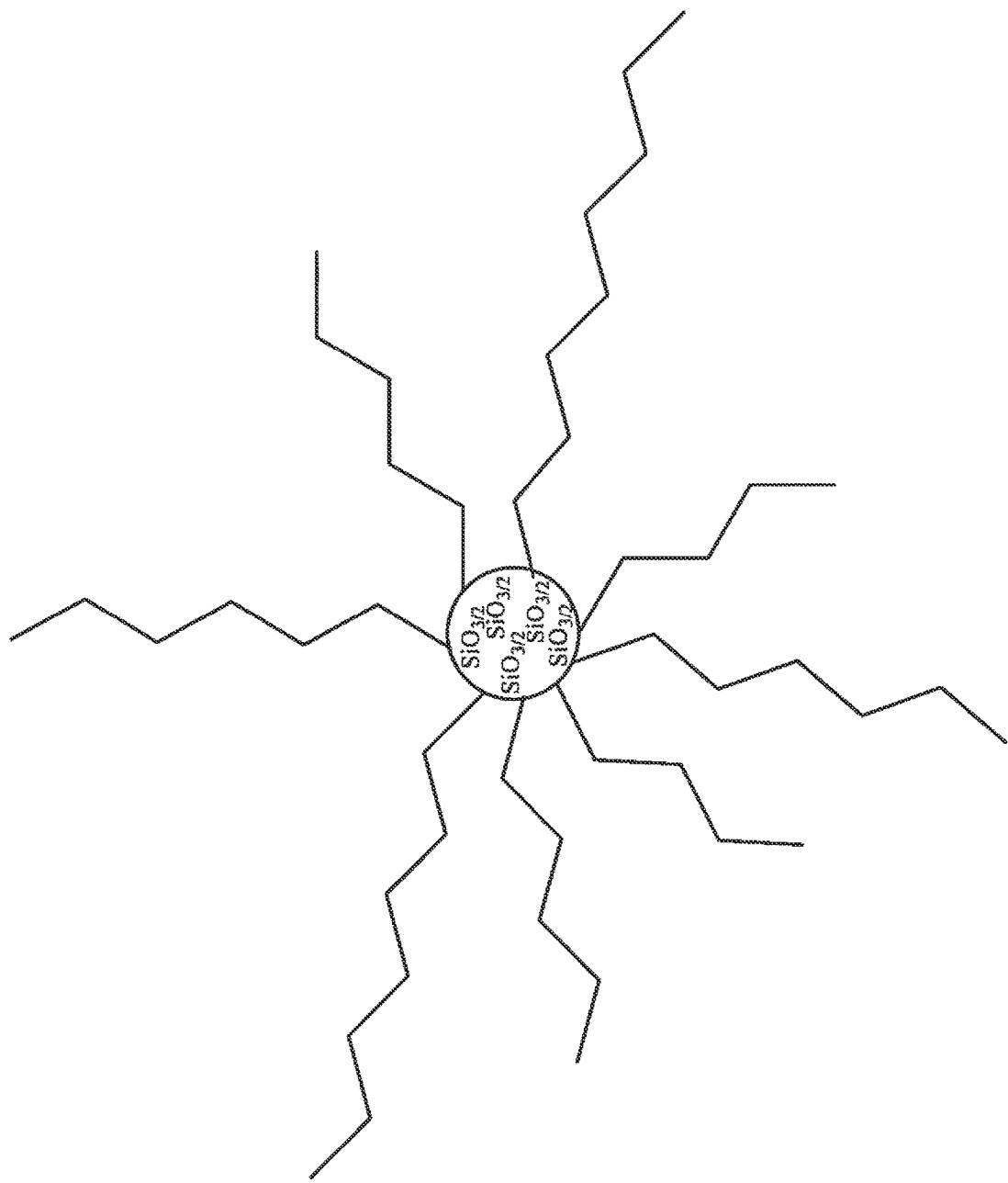
FIG. 4 is a schematic illustration of a hyperbranched polymer having a pure silsesquioxane core.

It was surprisingly found that, although the silsesquioxane unit by itself exhibits high modulus and high glass transition temperature (these materials are generally 'glass-like' and 'sand-like') and is not a material of choice in PSAs, PSA properties could be exhibited through proper design of new hyperbranched polymer(s). Examples of hyperbranched silicon-core-based PSA includes those illustrated in FIG. 4 with a pure silsesquioxane core and in FIG. 5 with a hybrid metallo-silsesquioxane core. Specifically, FIG. 4 depicts a hyperbranched structure with a silsesquioxane cage at its core and soft polymer chains as the branches. FIG. 4 is a more general representation of a hyperbranched polymer having a pure silsesquioxane core whereas FIG. 6 refers to one discrete hyperbranched polymer having eight silicon atoms in a fully condensed cage. The actual polymer comprises one or more hyperbranched polymers which may have either 6, 8, 12, etc. sized cages and/or combinations of different-sized cages. That is, the actual polymer may have six Si atoms in a first cage of a first hyperbranch polymer, eight Si atoms in a second cage of a second hyperbranch polymer as illustrated in FIG. 6, twelve Si atoms in a third cage of a third hyperbranch polymer, etc. and/or combinations of different-sized cages. Stated differently, the first hyperbranch polymer may have 6 precursor units, the second hyperbranched polymer may have 8 precursor units as illustrated in FIG. 6, and the third hyperbranched polymer may have 12 precursor units, etc and/or combinations of different-sized cages. Because each precursor has one silicon atom, the number of silicon atoms will be the same as the number of condensed precursors.

Figure 5:
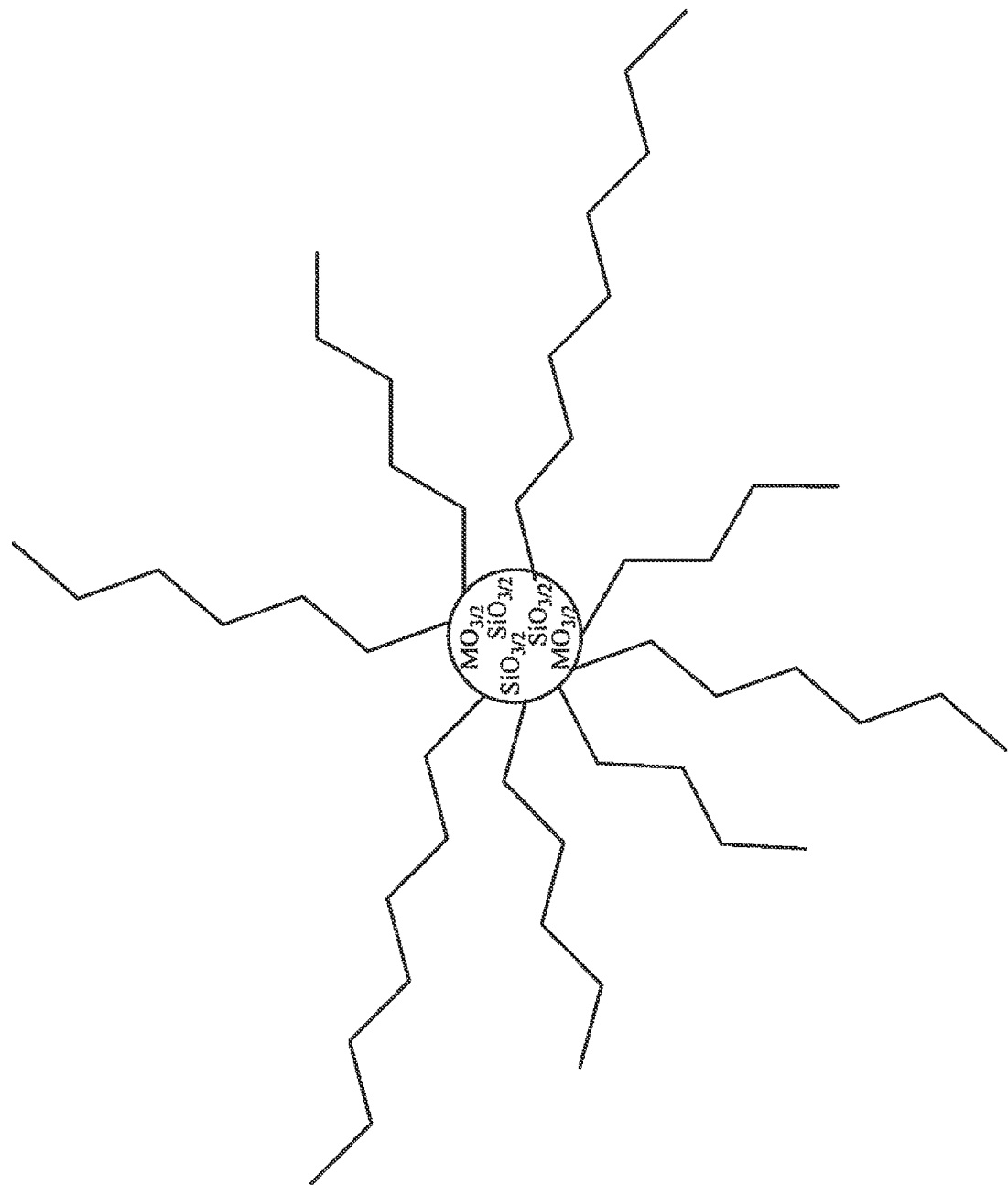
FIG. 5 is a schematic illustration of a hyperbranched polymer having a hybrid metallo-silsequioxane core.
Figure 6:
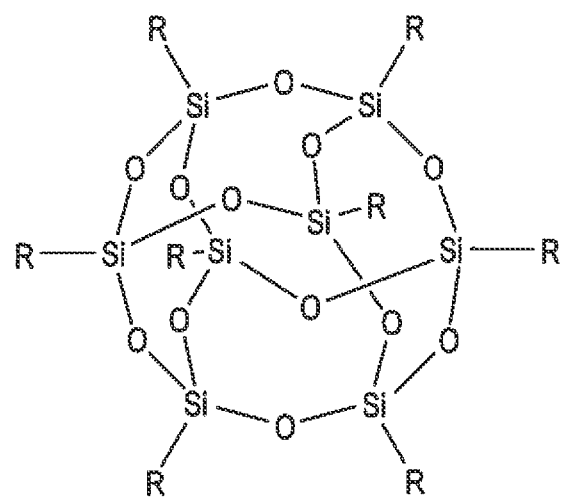
FIG. 6 is a schematic illustration of a fully condensed silsesquioxane unit with eight silicon atoms at the core.
Figure 10A:
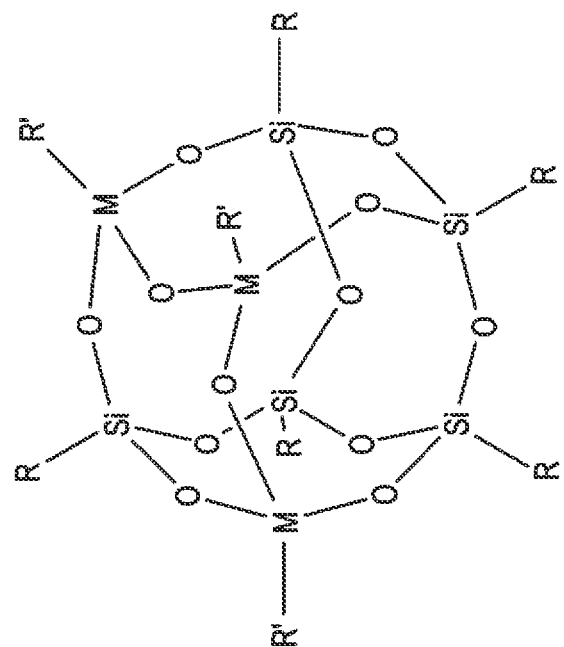
FIGS. 10A to 10E schematically illustrate various metallo-silsesquioxane units.

FIG. 5 shows a hyperbranched structure with a metallo-silsesquioxane cage at its core and polymer chains as the branches. FIG. 5 is a more general representation of a hyperbranched polymer having a hybrid silsesquioxane core whereas FIG. 10A refers to one discrete hyperbranched polymer having seven silicon atoms and one M atom in a fully condensed cage. And just as described above, the actual polymer comprises one or more hyperbranched polymers which may have either 6, 8, 12, etc. sized cages and/or combinations of different-sized cages. The R's in both FIGS. 4 and 10A represent the polymer chains of the hyperbranched polymer.

Additionally, it was discovered that this strategy not only enabled and/or simplified manufacturing possibilities but also delivered markedly improved performance while providing excellent means to tune adhesive performance. Forming hyperbranched polymers with silsesquioxane core(s) is novel to the PSA world. Without being bound by any theory, it is believed that this novel structure offers the best of both worlds. The silsesquioxane core contributes high strength and thermal resistance while the hyperbranches provide tack and quick stick. Additionally, in addition to higher strength and thermal resistance, the use of metallo-silsesquioxane core can generate polymers with altered and/or superior magnetic properties and optical properties (e.g., high refractive index), It must be noted that not all hyperbranched silsesquioxane-based structures result in formation of a PSA because the modulus and/or glass transition temperature of the resulting composition may be outside the range of PSAs.

The present subject matter provides a normally tacky PSA composition and adhesive coated sheet materials having a requisite fourfold balance of adhesion, cohesion, viscoelasticity, and glass transition temperature.

It is an object of the present subject matter to provide a synthetic strategy to prepare PSAs and tapes therefrom by molecularly assembling a novel architecture signified by a hyperbranched structure.

It is further an object of the present subject matter to provide a method of making soft hyperbranched shells of (meth)acrylate polymer chains around hard silsesquioxane core(s) useful to function as pressure sensitive adhesives.

It is a further objective of the present subject matter to create (meth)acrylate brush around hybrid metallo-silsesquioxane core(s) to form pressure sensitive adhesive materials.

It is a further object of the present subject matter to form a novel controlled architecture acrylic pressure sensitive adhesive with silicon oxide core(s).

It is a further object of the present subject matter to form a novel controlled architecture acrylic PSA with mixed silicon oxide-metal oxide core(s).

It is a still further object of the present subject matter to provide a synthetic strategy to synthesize terminal-functionalized acrylic precursors using free radical polymerization for use in hyperbranched pressure sensitive adhesives systems.

Before turning attention to the details of the present subject matter and the numerous aspects thereof, it is instructive to consider several terms and their definitions as used herein.

(Meth)acrylate-based PSA, as the term is used herein, refers to permanently tacky polymeric compositions comprising acrylate, methacrylate or any combination of such monomers wherein the monomer, an ester of acrylic acid or methacrylic acid, is polymerized or copolymerized with various comonomers containing a polymerizable ethylenic linkage. The polymer is formed via chain growth polymerization techniques. The (meth)acrylate polymers in pressure sensitive adhesives could be homopolymers, i.e. consisting of the same acrylic monomer to make up the polymer chain. Alternatively, the acrylate polymers can be copolymers, i.e. consisting of two or more different monomers placed in a polymer chain. These polymers consist of linear or branched chains. These polymers are cast on to filmic or foil carriers to form PSA tapes. In practice, most often the polymers also undergo slight crosslinking reaction(s) on the web to improve the polymer's internal strength. Crosslinking is facilitated by introducing reactive groups known in the art. The crosslinking of the polymer can be activated by either of the following triggers such as, heat, moisture, ultraviolet, and/or electron beam.

The term 'room temperature' used herein, refers to temperatures within the range of from about 15° to about 25° C.

The term 'acrylic polymer' used herein, refers to polymers formed from monomers of acrylates and/or methacrylates or any combination of these in a polymer composition wherein the monomers are esters of acrylic acid or methacrylic acid containing a polymerizable ethylenic linkage. This term also includes other classes of monomers with ethylenic linkage that can copolymerize with acrylate and methacrylate monomers.

The term 'fully condensed' silsesquioxane core refers to a silsesquioxane core where each silicon or metal atom covalently participates in forming three bonds using any combination of Si—O—Si and Si—O-M bonds (for example FIGS. 6, 7, 10A, 10B, and 10E).

The term 'partially condensed' silsesquioxane core refers to a silsesquioxane core where some of the silicon or metal atoms are covalently attached to any combination of two or less Si—O—Si and Si—O-M bonds (for example FIGS. 8A through E, 9, 10C, and 10D).

The term 'hyperbranched polymer' refers to macromolecules composed of multiple polymer units emanating from a central core such as shown in FIG. 3. A hyperbranched polymer is characterized by i) core and ii) branches which surround the core also referred to as 'shell' herein. The core is characterized by its functionality, which is the number of chemical bonds through which it can be connected to external parts of the molecule. Topologically, these are densely branched synthetic tree-like macromolecules with a large number of end groups.

The term 'pure silsesquioxane core' refers to a silsesquioxane core whereby none of the silicon atoms in the core has been substituted with another atom as shown in FIGS. 4, 6, 8A-8E, 9, and 12. The terms 'pure silsesquioxane core' and 'silsesquioxane core' will be used interchangeably in the description of this present subject matter.

The term 'hybrid silsesquioxane core' refers to a silsesquioxane core having one or more of the silicon atoms in the core substituted with another atom, such as, a metal or another Si atom. For example, a metallo-silsesquioxane core has one or more of the silicon atoms in the core substituted with a metal atom as shown in FIGS. 5, 10A-10D, and 13. The terms 'metallo-silsesquioxane core' and 'hybrid metallo-silsesquioxane core' will be used interchangeably in the description of this present subject matter.

The term 'polymer brush' is often characterized by the immobilization of one end of a polymer chain on to a substrate in high density. The limited space then leads to a strong extension of the chains, and unusual properties of the system. The terms 'hyperbranched' and 'brush' will be used interchangeably in the description of this present subject matter.

The term 'silane' refers to organo-silicon compounds having the following typical molecular structure: R—(CH$_2$)$_m$—Si(X)$_{3-n}$R'$_n$ where n=0, 1, 2 and m=0 to 20. Many combinations are possible, but silanes are characterized by the fact that they contain reactive groups X. The X groups are hydrolyzable groups such as but not limited to methoxy, ethoxy, acetoxy or oxime groups. The group R' is hydrogen, or a hydrocarbon. The group R can be hydrocarbon, hetero-carbon, polymeric, or functional group, such as epoxy, vinyl, amino, methacryloxy, or sulfido.

The term 'hydrolyze' refers to a reaction in which a Si—X bond breaks in the presence of water, even only with moisture adsorbed on the surface, to form silanol Si—OH group.

The term 'condensation' refers to a reaction where two silanol groups condense splitting off water to form structures with very stable siloxane Si—O—Si bonds.

The term 'precursor' refers to an acrylic or methacrylic polymer, as defined above, which is capped with a single silane unit at one end of the molecule. The term 'precursor,' in the present subject matter refers to a starting molecule or macromolecular unit that can through hydrolysis-condensation reaction(s) or direct condensation bypassing the hydrolysis step self-assemble to form a hyperbranched structure as described herein in detail.

Figure 1A:
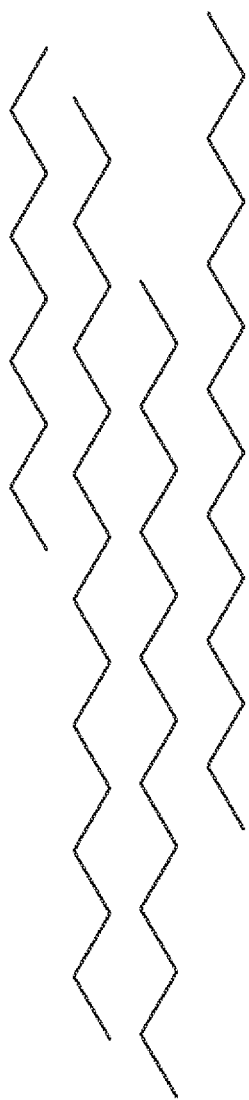
FIG. 1A is a schematic illustration of uncrosslinked linear polymer chains.
Figure 1B:
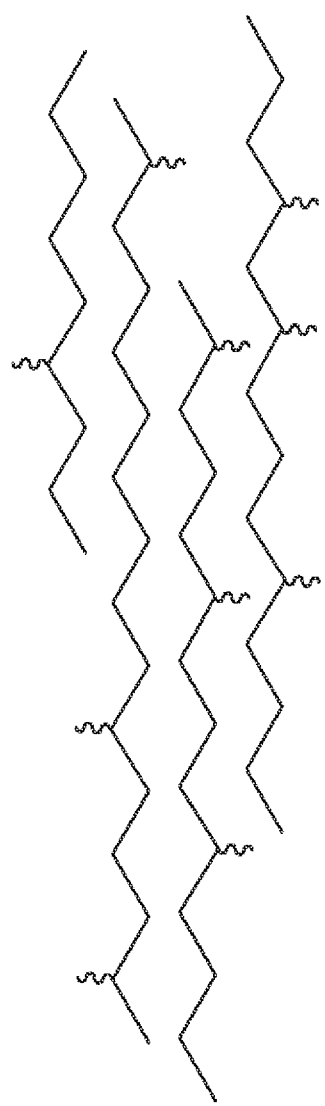
FIG. 1B is a schematic illustration of uncrosslinked branched linear polymer chains.
Figure 2A:
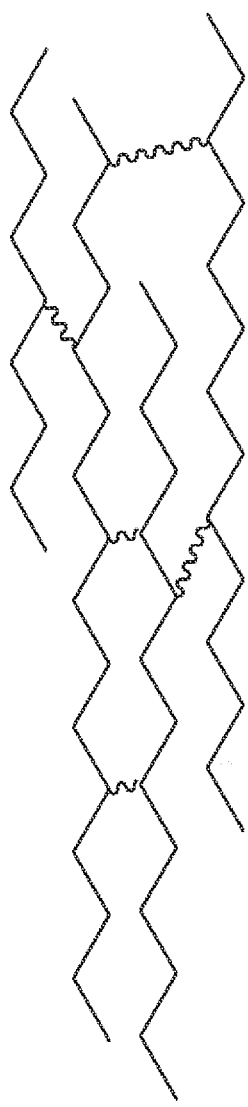
FIG. 2A is a schematic illustration of crosslinked linear polymer chains in which crosslinking occurs via randomly placed groups throughout the chains.
Figure 2B:
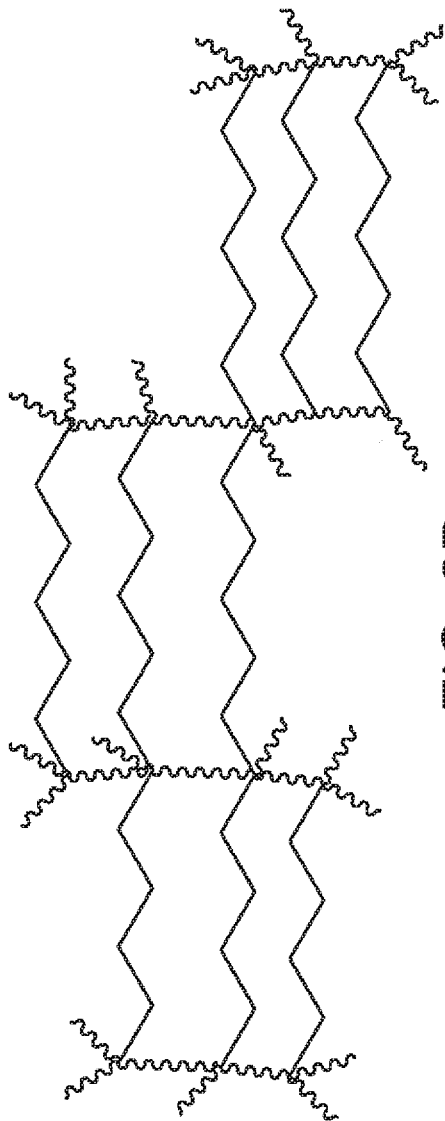
FIG. 2B is a schematic illustration of crosslinked linear polymer chains in which crosslinking occurs via terminal groups.

The terms 'crosslink' or 'crosslinking' refer to a process of forming chemical bonds that link one polymer chain to another polymer chain at more than one point along the chain. A polymer chain is covalently pinned to other chains in more than one location as illustrated in FIG. 2. This is in sharp contrast to hyperbranched polymers where the chains are pinned at only one location as illustrated in FIG. 3.

Because the silsesquioxane unit forms the core of the hyperbranched structure of the present subject matter it will also be instructive to briefly consider its definition and associated jargon. A silsesquioxane unit is a family of organosilicon compounds characterized by a ratio of 1.5 between silicon and oxygen atoms signified by the general formula $[RSiO_{3/2}]_n$ where n is an even number and R is an organic or inorganic group such as alkyl, aryl, heterocarbon, polymer, oligomer, (meth)acrylate polymer, (meth)acrylate oligomer, and combinations thereof. A number of diverse substituents (R) can be attached to the Si centers. Molecules of such structure are unusual because they feature an inorganic silicate core and an organic exterior. The organic groups emanate from the central silicate core which results in formation of the hyperbranched structure. Additionally, the benefits of hyperbranched and brush structure are inherent in these molecules. In some literature, such silsesquioxane structures are also referred to as 'organic-inorganic hybrids.'

Silsesquioxane structures are formed when select silanes undergo hydrolysis and condensation. Subject to certain reaction conditions, silanes can also undergo direct condensation bypassing the hydrolysis step. One such structure belonging to the silsesquioxane family is represented in FIG. 6. In this particular example, a polyhydral structure with eight silicon atoms i.e., $(R—SiO_{1.5})_8$, is formed to produce a fully condensed silsesquioxane molecule(s). The silsesquioxane core renders rigidity and thermal stability to the molecule. It must be noted that not all silanes react to automatically form silsesquioxane structures. A description of silsesquioxanes is disclosed by P. Eisenberg, R. Erra-Balsells, Y. Ishikawa et al., "Cagelike Precursors of High-Molar-Mass Silsesquioxanes Formed by the Hydrolytic Condensation of Trialkoxysilanes,"*Macromolecules*, vol. 33, no. 6, pp. 1940-1947, 2000). FIG. 6 shows the chemical structure of fully condensed silsesquioxane unit with eight silicon atoms at the core.

Many stoichiometrically well-defined silsesquioxane frameworks can be envisioned with synthetically useful functional R groups. They are most often prepared via hydrolysis and polycondensation reactions of trifunctional organosilicon moieties, e.g., $R—(CH_2)_m—Si(X)_3$ where m=0 to 20, where X is a hydrolyzable group such as halogen, acyloxy, ketoximate, and alkoxy, and where R is nonhydrolyzable organic group linked by Si—C bond. Three such hydrolyzable groups on silicon atom(s) are required to form the silsesquioxane core. The alkoxy group is particularly preferable as the X group since its hydrolyzability is mild and is easy to handle.

Figure 7:
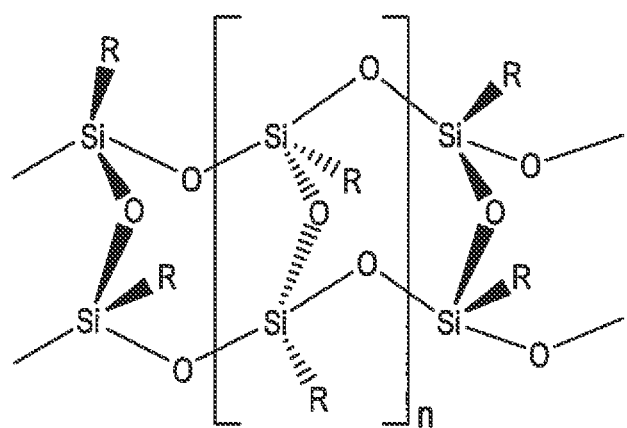
FIG. 7 is a schematic illustration of the chemical structure of a fully condensed polymeric silsesquioxane unit.

Completely condensed silsesquioxanes $(R—SiO_{1.5})_n$ with n=4, 6, 8, 10, and 12 are known in molecular form which corresponds to 4, 6, 8, 10, and 12 Si vertices, respectively. The cages are sometimes labeled $T_4$, $T_6$ $T_8$, $T_{10}$, and $T_{12}$, respectively (T=each Si center is chemically bonded to three oxo groups and the subscript is the number of Si atoms forming the cage). Additionally, silsesquioxanes can also exist in polymeric form. In polymeric form, silsesquioxane takes a ladder structure as shown in FIG. 7. In all caged and polymeric forms having fully condensed silsesquioxane cores, each Si center is bonded to three oxo groups, which in turn connect to other Si centers. The fourth group on Si is usually a hydrocarbon, alkyl, aryl, heterocarbon, polymer, oligomer, (meth)acrylate polymer, (meth)acrylate oligomer, and combinations thereof. FIG. 7 shows the chemical structure of a fully condensed polymeric silsesquioxane unit. In caged and polymeric forms having partially condensed silsesquioxane cores, not all Si centers are bonded to three Si—O—Si groups, some Si centers are bonded to less than three Si—O—Si groups as shown in FIGS. 8A-8D.

Silsesquioxane structures usually form from the hydrolysis and subsequent condensation of a hydrolyzable silane molecule. An idealized synthesis may proceed in the following distinct steps:

a) Hydrolysis:

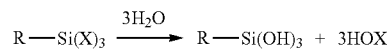

b) Condensation:

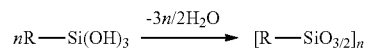

In the example of FIG. 6, n equals 8.

The structure of the silsesquioxane framework depends a great deal on its method of preparation. The structure is uniquely sensitive to a highly interdependent combination of experimental factors, including product solubilities, initial silane concentration, nature and stability of the solvent, temperature, pH, the amount of free water available, and the type of catalyst (acid or base) used to facilitate condensation. The reaction is generally catalyzed by bronsted acids, lewis acids, bases, and amines. Careful hydrolysis leads to well-defined, fully condensed, structures T4-R, T6-R, T8-R, T10-R, and T12-R. Note that polyhedral silsesquioxanes are also referred to as spherosiloxanes, since polyhydral structures are topologically equivalent to a sphere.

In addition to the fully condensed structure, incompletely condensed structures containing Si—OH groups are also known, which have the generic formula; $[R—SiO_{3/2}]_n (H_2O)_{(3n/2)-x}$ where n is a positive integer and x signifies the degree of condensation and can take on positive integral values less than or equal to 3n/2.

As the condensation process begins, it goes through the following two elementary steps, the first one leading to incomplete condensation followed by a second one leading to fully condensed state:

a) Incompletely condensed silsesquioxane:

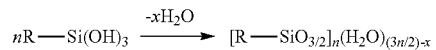

b) Fully condensed silsesquioxane:

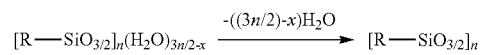

These incompletely condensed materials can be a single well defined structure or a mixture of perfectly closed polyhedrals as well as open polyhedrals with dangling —OH groups, ladder-type structure, and open structures with more —OH groups, linear structure and a wide variety of other possible combinations. Although not limited to these, FIGS. 8A-8E provide illustrative examples of partially condensed silsesquioxane structures containing 8, 7, 6 and 5 silicon atoms. Further, to exemplify multiple possibilities, the structure with 6 silicon atoms is illustrated at two levels of condensed state. These partially condensed silsesquioxanes are intermediates en route to the fully condensed cages. Specifically, FIGS. 8A-8E show various chemical structures of partially condensed silsesquioxane cores having seven silicon atoms (FIG. 8A), FIG. 8B six silicon atoms (FIG. 8B), five silicon atoms (FIG. 8C), six silicon atoms (FIG.

Figure 8B:
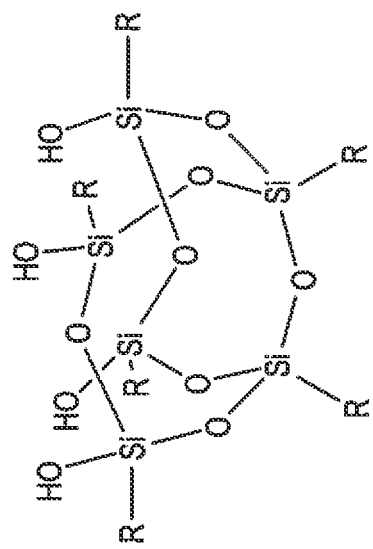
FIGS. 8A to 8E schematically illustrate partially condensed silsesquioxane structures.
Figure 8D:
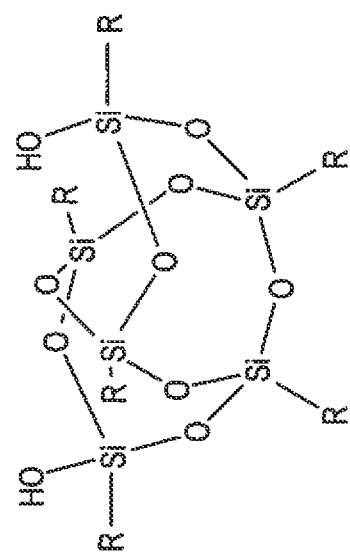
Figure 8A:
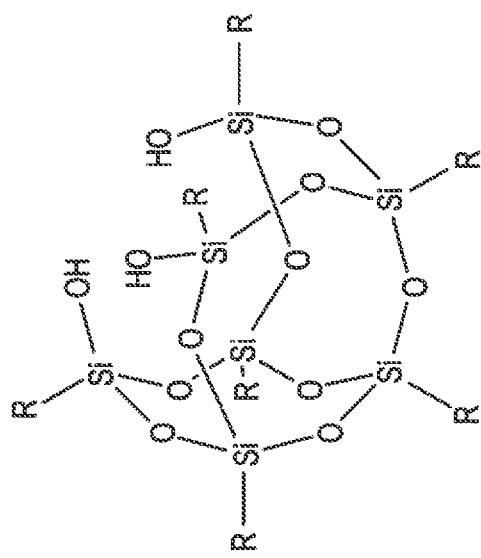
Figure 8C:
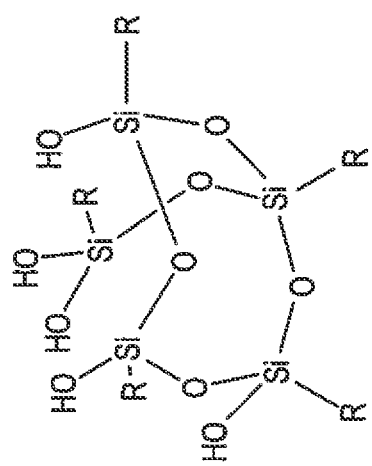
Figure 8E:
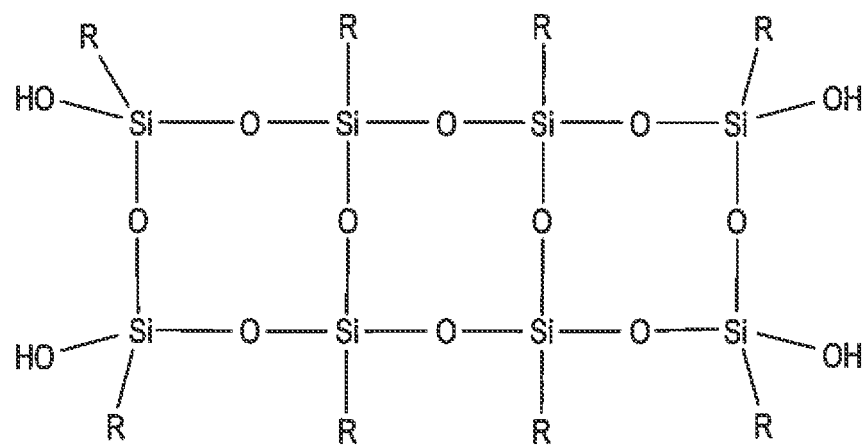

8D), and a silsesquioxane in a ladder arrangement having eight silicon atoms (FIG. 8E).

Figure 9:
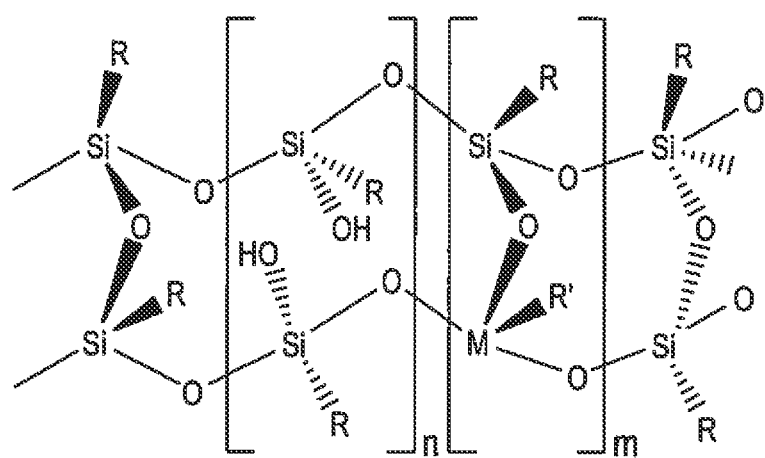
FIG. 9 is a schematic illustration of partially condensed silsesquioxane in a ladder structure.

Furthermore, polymeric silsesquioxanes have also been reported. High molecular weight tractable polymeric silsesquioxanes feature a ladder-type structure such as shown in FIG. 7. Other partially condensed species adopt ladder structures wherein two long chains composed of $RSiO_{3/2}$ units are connected at regular intervals by Si—O—Si bonds such as shown in FIG. 9. Additionally, amorphous structures include $RSiO_{3/2}$ unit(s) connected without any organized structure formation. Specifically, FIG. 9 shows a partially condensed polymeric silsesquioxane structure having a ladder arrangement.

The silanols that are generated in situ within incompletely condensed silsesquioxane intermediates are stable compounds which result in silsesquioxane with one or more hydroxyl group(s) with decent stability. At the same time, the Si—OH groups are sufficiently reactive to further react with metals and metalloids compounds to create new hybrid metallo-silsesquioxanes. The incompletely condensed silsesquioxanes bind numerous metals, including $Na^+$, $Li^+$, and $Be^{2+}$ as well as metalloids and transition metals.

Another variation of silsesquioxane structures is the formation of hybrid core(s) where one or more of the silicon atoms in the core are substituted with another atom. Materials added to form hybrid core(s) are referred to as 'core modifier' herein. It must be noted that this results in modification at the core level. The hybrid silsesquioxane allows a wide range of applications. Their chemistry has been extensively developed over the past 10-15 years. For example, well defined prismatic metallo-silsesquioxane derivatives of the core stoichiometry $[(RSi)_n(R'M)_mO_{1.5}]_{n+m}$ can be prepared by treating the incomplete cage with a metal halide in the presence of a catalyst. This synthesis can be a sequential reaction or can be a one pot reaction where the metal component is added as an integral blend at the start of the hydrolysis step. An example of its reaction is illustrated below.

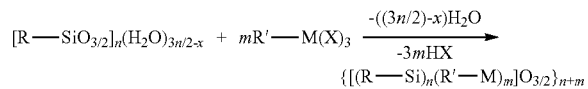

Figure 10B:
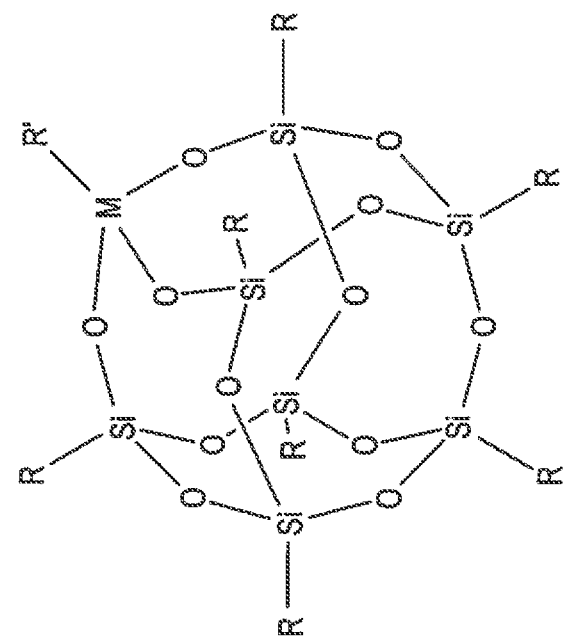
Figure 10D:
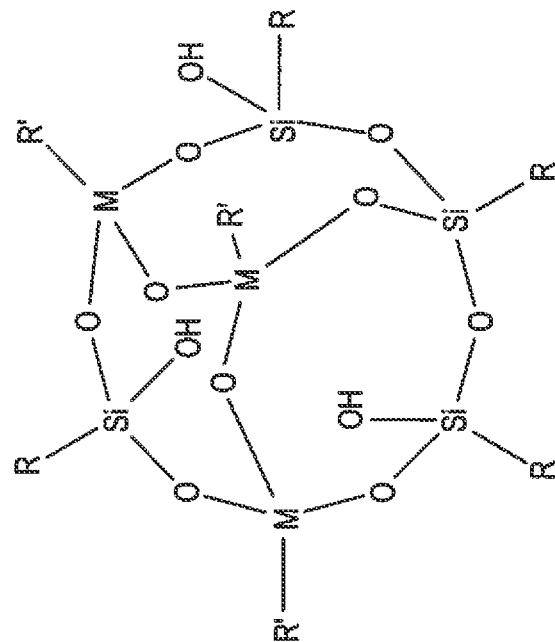
Figure 10C:
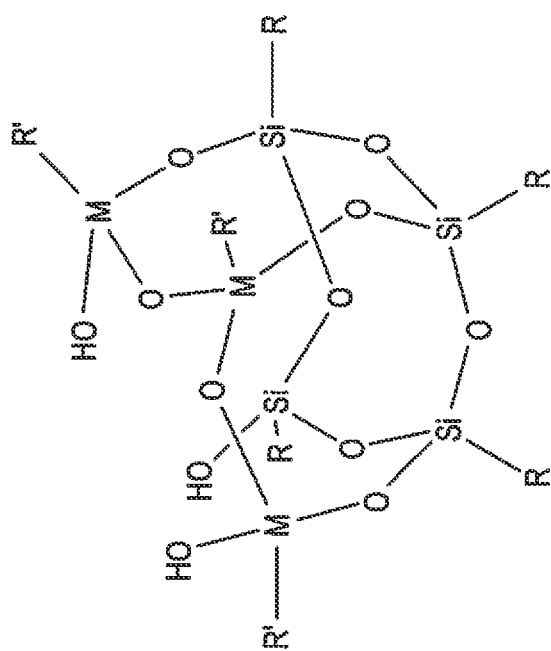
Figure 10E:
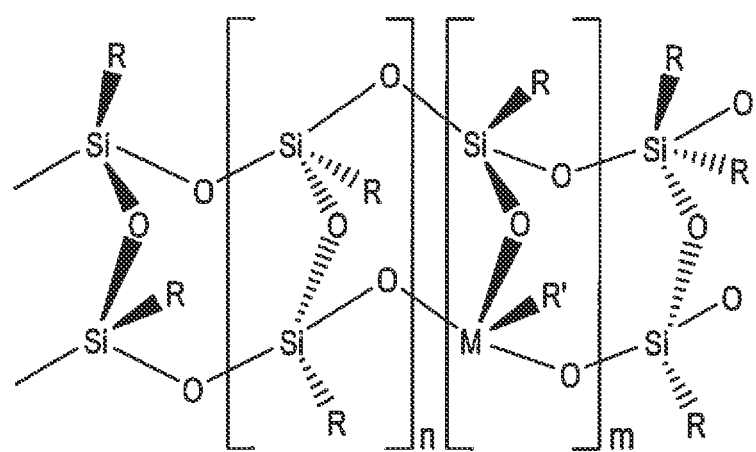

Some illustrative structures but not limited to these are provided in FIGS. 10A-10E when silsesquioxane polyol is co-reacted with a variety of compounds of the type $RMX_3$ in which R=alkyl, alkenyl, aryl, H; M=Al, Si, Ge, Sn, Ti, or Zr; and X=organic ligand, halogen or alkoxide. This synthetic strategy leads to a wide variety of hybrid silsesquioxane cores. Specifically, FIGS. 10A-10E show various chemical structures of metallo-silsesquioxane units; FIG. 10A illustrates a fully condensed core having seven silicon atoms and one metal atom, FIG. 10B illustrates a fully condensed core having five silicon atoms and three metal atoms, FIG. 10C illustrates a partially condensed cores having four silicon atoms and three metal atoms, FIG. 10D illustrates a partially condensed core having four silicon atoms and three metal atoms, and FIG. 10E illustrates a polymeric metallo-silsesquioxane in a ladder arrangement.

In other aspects, partially condensed silsesquioxane can react with, for example, $CrO_3$ to yield chromium silsesquioxane. Partially condensed silsesquioxane can react with, for example, $(C_3H_7)_3VO$ to yield vanadium silsesquioxane. Partially condensed silsesquioxane can react with, for example, $FeCl_3P(c-C_6H_{11})_3$ to yield iron silsesquioxane. Partially condensed silsesquioxane can be transmetallated with, for example, Mo to yield molybdenum silsesquioxane. Other metals known to incorporate in silsesquioxane structures include but are not limited to copper, rhodium, tungsten, osmium, and platinum.

In all aspects, despite the possibility of many silsesquioxane structures, the exact structure of silsesquioxane is immaterial to the practice of the present subject matter. In many cases the composition will be a mixture of hyperbranched systems comprising multiple silsesquioxane core structures.

Figure 11:
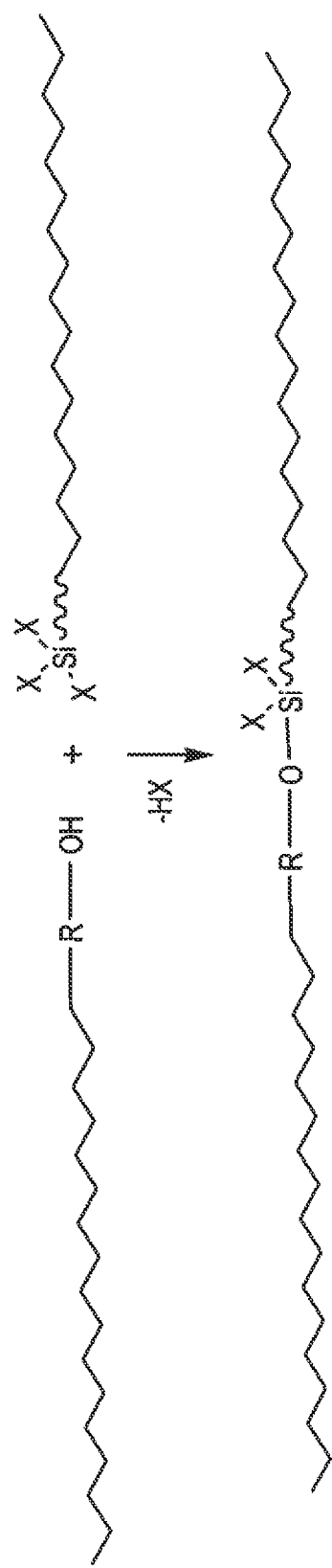
FIG. 11 schematically illustrates reaction between an organic alcohol and a hydrolyzable silane.

The hydrolyzable silanes readily undergo another similar type of condensation reaction with organic alcohols if present in the reaction medium. A Si—O—C bond is formed through the reaction of Si—X with the hydroxyl functionality of the organic moiety as illustrated in FIG. 11. FIG. 11 shows direct condensation of silane with hydroxyl group. Although the mechanism of this reaction is not completely understood, it is generally regarded to proceed through one step condensation. This method has been utilized in the production of silsesquioxanes with bulky R groups.

Figure 12:
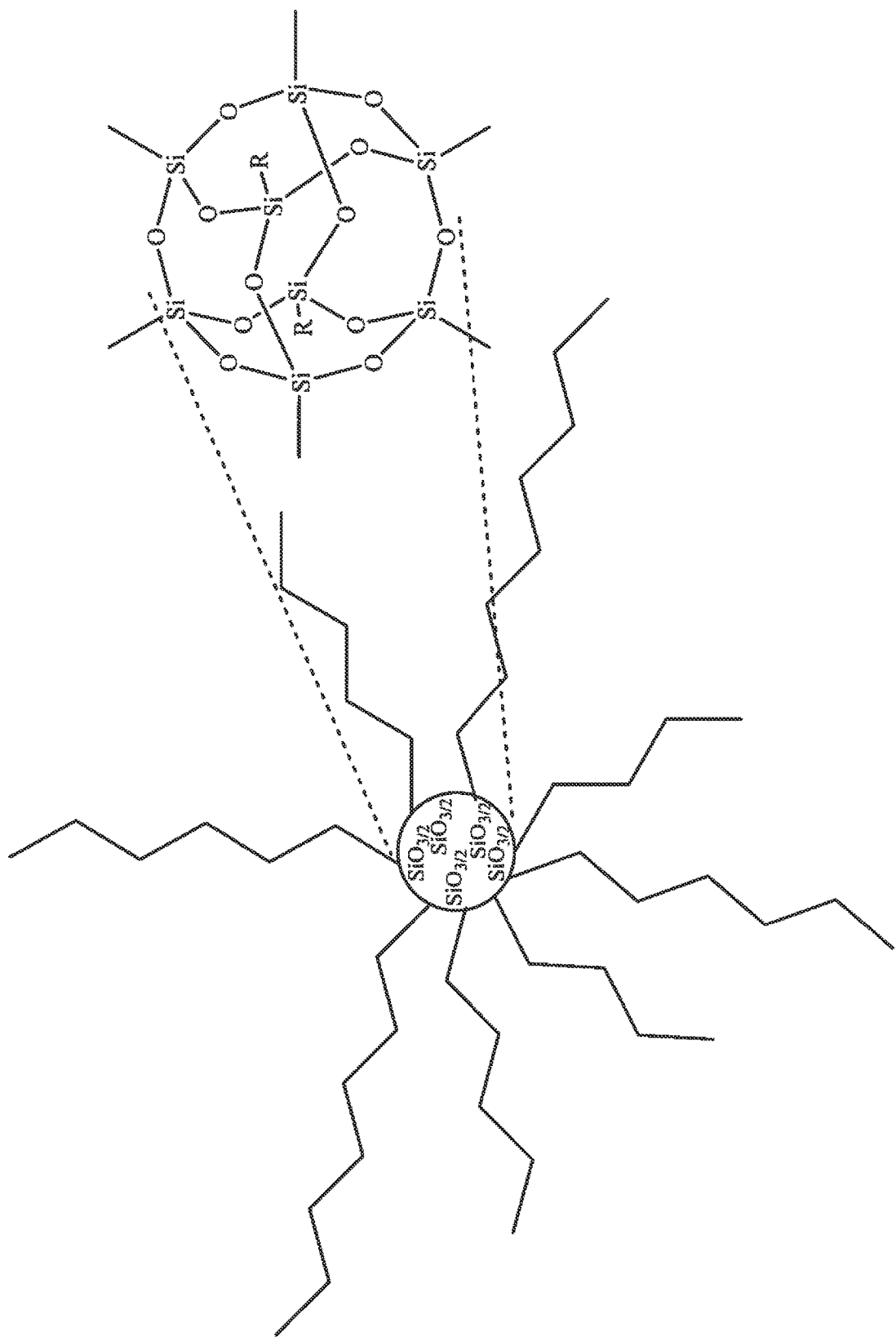
FIG. 12 is a schematic illustration of an eight silicon, fully condensed silsesquioxane core having eight arms or branches.

Using the convergent procedure described previously to form hyperbranched structures and without being bound by any theory, it is believed that suitable acrylate precursors of the type noted herein, when subjected to this reaction will form similar silsesquioxane cores hyperbranched with acrylate polymer chains. This approach to control the polymer architecture produces pressure sensitive adhesives with novel structures. An example of a completely closed polyhedral structure of a pressure sensitive adhesive molecule as envisioned herein is illustrated in FIG. 12. FIG. 12 depicts an eight silicon, fully condensed silsesquioxane core in which a polymer chain emanates from each silicon atom. This structure illustrates an eight arm hyperbranched polymer molecule. Each arm represents a (meth)acrylate polymer chain. All chains emanate from a central silsesquioxane core. The structure of the silsesquioxane core can be any of the ones described herein. The silsesquioxane core can be either fully or partially condensed. Furthermore, the core can be in cage or polymeric form. Furthermore, the core can be a mixture of any of the forms noted herein in any combination.

Figure 13:
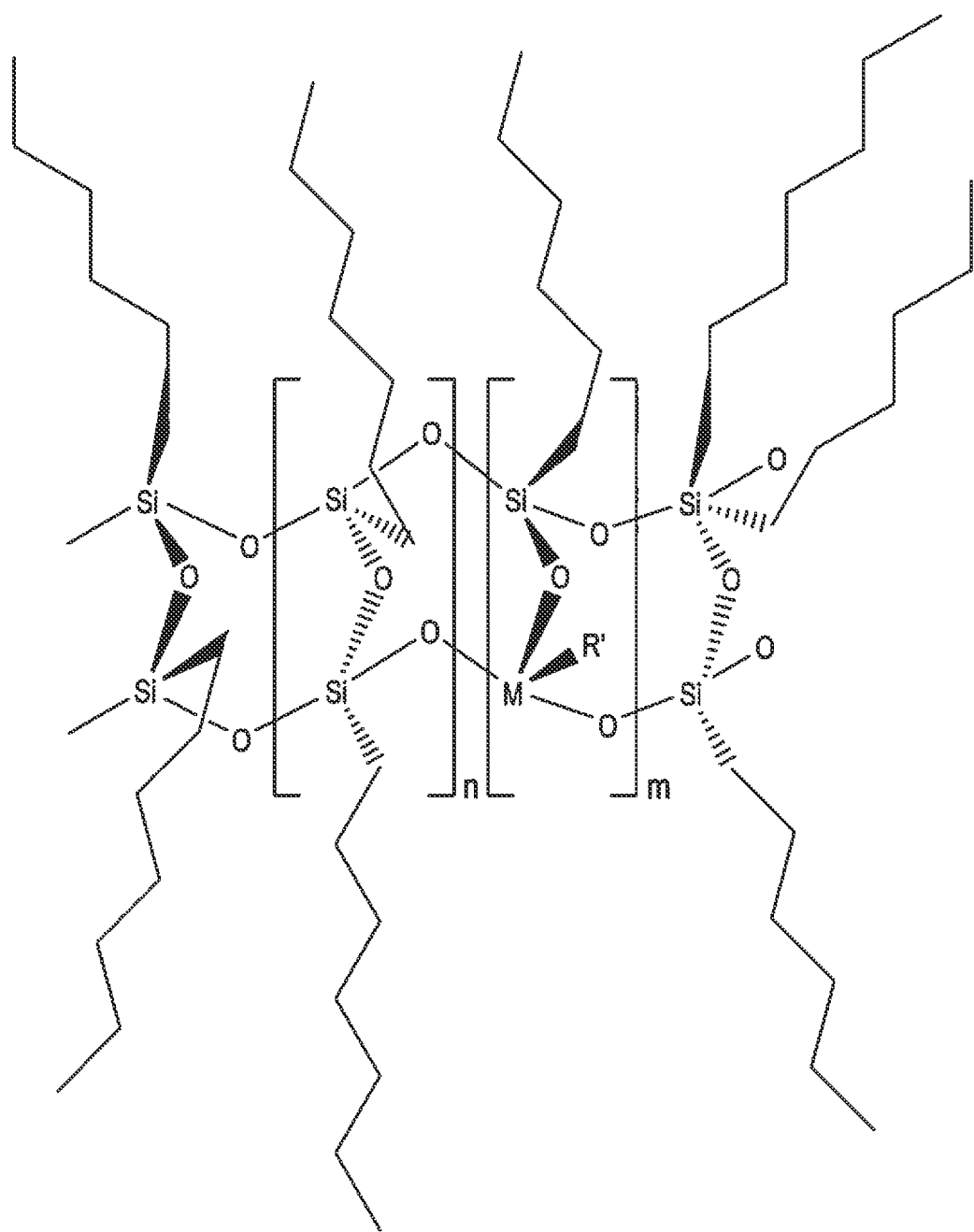
FIG. 13 is a schematic illustration of a fully condensed polymeric metallo-silsesquioxane core in which each silicon atom is linked to a polymer chain.

In another example of a hybrid core, a polymeric metallo-silsesquioxane structured PSA molecule as envisioned herein is illustrated in FIG. 13. FIG. 13 shows a fully condensed polymeric metallo-silsesquioxane core in which each silicon atom is linked to a polymer chain.

Figure 14A:
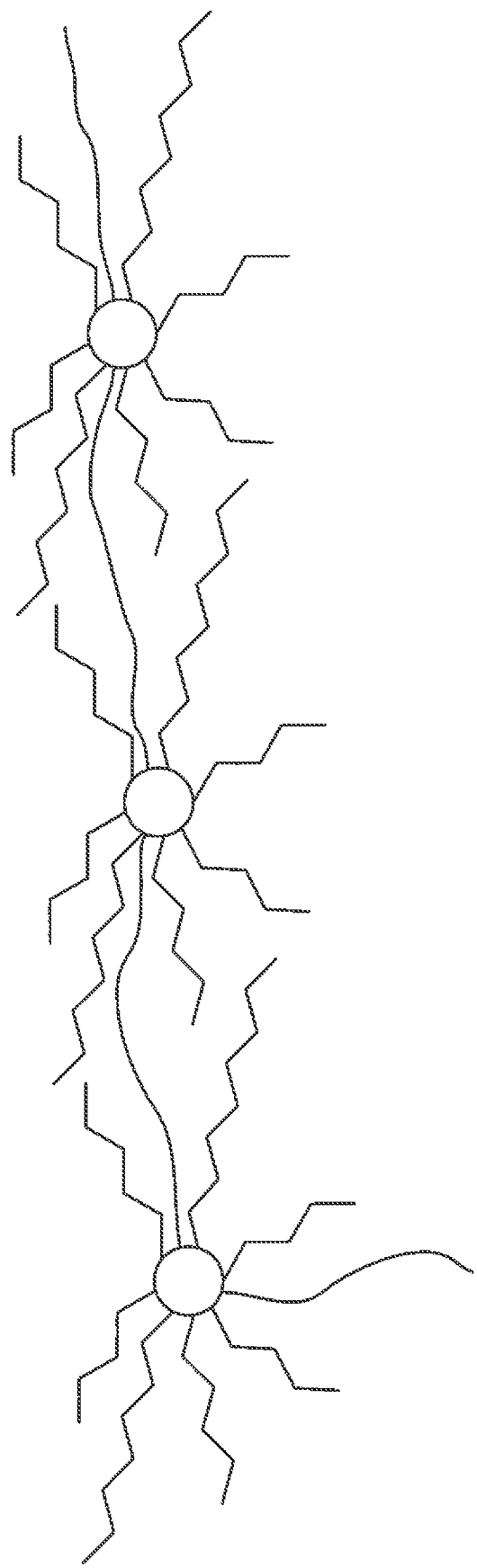
FIG. 14A is a schematic illustration of several hyperbranched silsesquioxane units linked in a pearl chain arrangement.
Figure 14B:
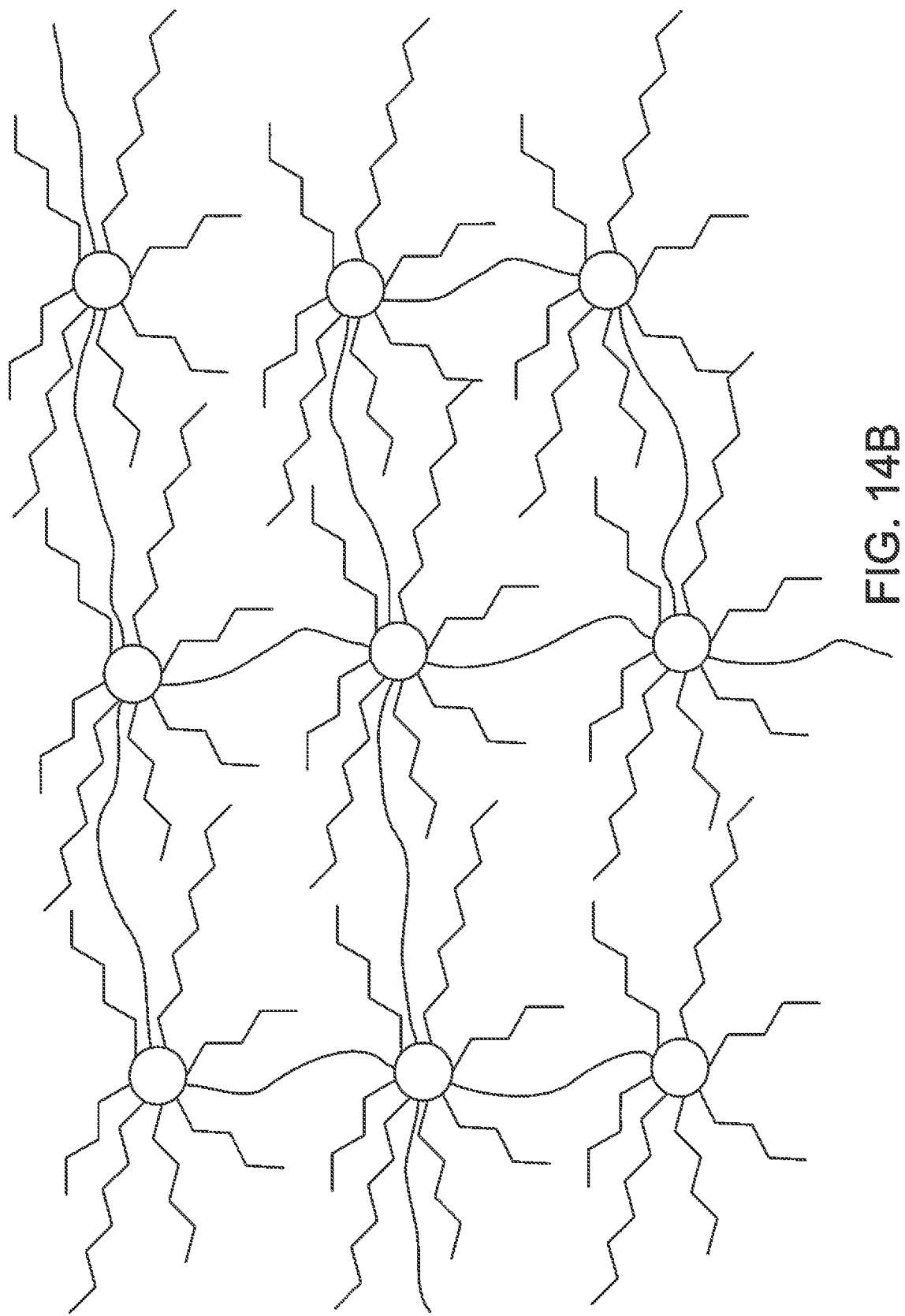
FIG. 14B is a schematic illustration of several hyperbranched silsesquioxane units in a network arrangement.

One skilled in the art will appreciate that integrating PSA and silsesquioxane in one package is not intuitive. One will also appreciate that it is a novel concept. As far as is known, such designed architecture and its resulting benefits have not been described in the prior art. In fact, one would expect the hard silsesquioxane core to have a detrimental effect on PSA properties, however, surprisingly this design provided unexpected benefits. This design simplified the synthetic process while expanding the performance window of the resulting materials, e.g., the PSAs. In contrast to the linearly constructed chains prevalent in conventional pressure sensitive adhesive systems, the hyperbranched silsesquioxane-core is novel. This new architecture and synthetic strategy provides a practitioner with better control of performance and process parameters. The properties of hyperbranched silsesquioxane can be controlled either through core level modification (e.g., Example 11) or through branch level modification (e.g., Examples 1 to 7) of molecular structure, constitution and molecular weight. In one aspect, the discrete silsesquioxane cores may be linked in a pearl chain or in a multidimensional network structure/arrangement as illustrated in FIGS. 14A and 14B. It is contemplated that by adding a controlled amount of diol, triol, or polyol or any combination thereof during the condensation step, each one of the silsesquioxane cores of a portion of the hyperbranched polymers will serially and covalently link to another silsesquioxane core(s) to form the pearl chain structure. For example, in the case of a diol, one hydroxyl group will react with one silsesquioxane core of a hyperbranch opolymer while the other hydroxyl group will react with a silsesquioxane core of another hyperbranch polymer to form one link of the pearl chain. The general structure of diol, triol, or polyol is

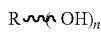

where R is a spacer group situated between the OH groups, and n is selected from the group consisting of 2, 3, 4, and combinations thereof. Spacer groups are small or large molecules containing two or more hydroxyl groups. As depicted in FIG. 11, these hydroxyl groups directly participate in condensation reaction with a hydrolyzable silane moiety to form Si—O—C bonds. Examples of spacer groups can range from but not limited to polyether-base polyols, polyester-based polyols, and polycarbonate based polyols. It is contemplated that the spacer group can react with two or more neighboring silsesquioxane units to link those in a pearl chain configuration. The amount of the polyol can range from about 0% to about 30% or about 0% to about 20% or about 0% to about 30% by weight of the PSA and/or the hyperbranched polymer. Too high an amount will lead to many tightly linked cores which could weigh negatively on PSA performance and in certain applications should be avoided.

It is further contemplated that adding a controlled amount of hydrolyzable di-silane during the condensation step, each one of the silsesquioxane cores of a portion of the hyperbranched polymers will covalently linked to other one or more silsesquioxane cores to form a multidimensional network structure. The general structure of hydrolyzable di-silane is

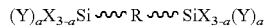

in which R is an organic group situated between the two hydrolyzable silane moieties, X is a hydrolyzable group selected from the group consisting of halogen, acyloxy, ketoximate, alkoxy, and combinations thereof, Y is an organofunctional group, and each 'a' is independently selected from 0, 1, and 2. The amount of the hydrolyzable di-silane can range from about 0% to about 30% or about 0% to about 20% or about 0% to about 30% by weight of the PSA and/or the hyperbranched polymer. Too high an amount will lead to many tightly linked cores could weigh negatively on PSA performance and in certain applications should be avoided. Specifically, FIG. 14A shows several hyperbranched silsesquioxane units linked in a 'pearl chain' or serial arrangement. FIG. 14B shows several hyperbranched silsesquioxane units linked in a multidimensional network structure/arrangement, most commonly being a two dimensional network structure.

In many aspects, design of the precursor unit(s) is beneficial for obtaining the desired outcome. It will also be appreciated that to achieve reasonable pressure sensitive adhesive performance, in many aspects each precursor unit should have essentially a single silane group which should also be located in a terminal position. Not all acrylic precursors bearing silane groups are capable of forming a hyperbranched topology. Instead, most such systems are designed to promote the undesired crosslinking reaction. For example, more than one hydrolyzable silane group will pin the polymer chain at multiple locations resulting in a tightly crosslinked structure which is typically detrimental to pressure sensitive adhesive function. Furthermore, the presence of the hydrolyzable silane group at a position other than the terminal position will sterically impede the formation of a well-defined hyperbranched silsesquioxane core associated with the present subject matter.

Figure 15:
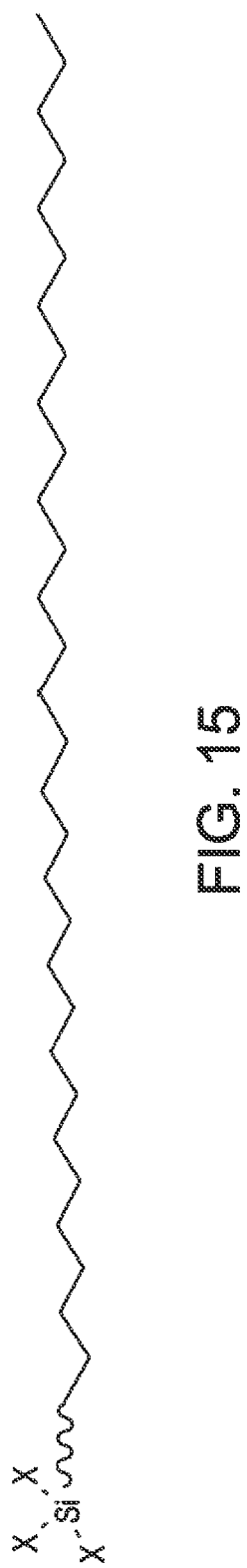
FIG. 15 is a schematic illustration of a precursor unit including a polymer chain linked to a silane group.

In practicing the present subject matter, a precursor comprising an acrylate polymer bearing a silane functionality primarily represented with a general formula R—Si(X)$_3$ wherein R is one of a nonhydrolyzable organic group, a nonhydrolyzable oligomer chain, and a nonhydrolyzable polymer chain, and X is a hydrolyzable group as illustrated in FIG. 15 is subjected to hydrolysis and condensation in the presence of a catalyst leading to formation of a hyperbranched silsesquioxane core in a convergent synthetic strategy. FIG. 15 shows a precursor unit including a polymer chain chemically linked to a silane group. The polymer chain itself can comprise homo- or copolymer. The polymer chain can be linear or branched. The hydrolysis/condensation reaction proceeds readily in the presence of traces of moisture and heat. However, moisture may not be required in the presence of a catalyst or co-reactant.

In one aspect, compositions including the precursor, core modifier and catalyst according to the present subject matter may be dissolved in theta solvent and cast on a carrier substrate in film form. The coated film is subjected to either a temperature range of from about 20° C. to about 50° C. or elevated temperature range of from about 51° C. to about 170° C. to concurrently evaporate the solvent while undergoing condensation to form the hyperbranched silsesquioxane core.

In another aspect, compositions including the precursor, core modifier and catalyst according to the present subject matter may be heated to facilitate solvent-free formulation and dispensing. The formulation is applied on a carrier substrate in film form. The coated film is subjected to condensation reaction(s) at either a temperature range of from about 20° C. to about 50° C. or elevated temperature range of from about 51° C. to about 170° C. to form hyperbranched hybrid-silsesquioxane core.

Furthermore, in this precursor the silane functionality is chemically bound to an acrylate polymer chain through a spacer group. In many aspects, in order to ensure formation of the silsesquioxane core, the number of silicon atoms contained in this reactive silane group cannot be more than one. In certain aspects, to ensure a silsesquioxane core each precursor molecule cannot have more than one silane groups. In certain aspects, to ensure a silsesquioxane core, the silane functionality must bear at least two or three hydrolyzable X groups, and more preferably three groups.

Several chemistries for the hydrolyzable X group are available and can be used in the present subject matter. However, the alkoxy group is preferred in view of its mild reactivity and availability. Precursors with the following hydrolyzable moieties on silane are preferable:

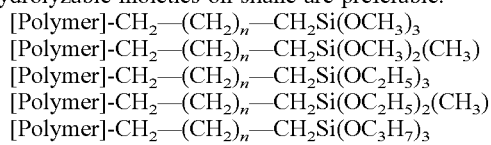

[Polymer]-CH$_2$—(CH$_2$)$_n$—CH$_2$Si(OC$_3$H$_7$)(CH$_3$)
where n is an integer from 0-18. The trialkoxy silane group found in these compounds, hydrolyzes and condenses under appropriate conditions to form silsesquioxane structures thereby forming the core of the hyperbranched structure.

The number average molecular weight of the precursor is typically from about 2,000 to about 300,000 g/mole, and preferably from 10,000 to 50,000 g/mole. The number average molecular weight of the pressure sensitive adhesive is typically from about 20,000 to about 1,000,000 g/mole or about 30,000 to about 500,000 g/mole, or about 50,000 to about 200,000 g/mole. However, it will be understood that in no way is the present subject matter limited to these molecular weights. To ensure that the hyperbranched silsesquioxane derived therefrom exhibits pressure sensitive adhesive properties, the chemical composition of the precursor is chosen so that the final overall hyperbranched silsesquioxane conforms to the rules of Dahlquist criteria and glass transition temperature requirements for pressure sensitive materials, which are known in this field of art. According to what has come to be known as the Dahlquist criteria, to perform as a pressure sensitive adhesive, the formulation must have a plateau shear modulus at 25° C. and 1 radian per second that is between 5×10$^4$ and 6×10$^6$ dynes/cm$^2$ as determined by dynamic mechanical analysis. A material having plateau shear modulus greater than 1×10$^7$ dynes/cm$^2$ at 25° C. will be too stiff to exhibit tack at room temperature to be useful as pressure sensitive adhesive. A material with plateau shear modulus less than 1×10$^4$ dynes/cm$^2$ at 25° C. will lack sufficient cohesive strength to be useful as pressure sensitive adhesive. Representative and non-limiting examples of ranges of the DSC measured glass transition temperatures (Tg) for the pressure sensitive adhesives of the instant subject matter are from about 10° C. to about −60° C., or from about 0° C. to about −40° C., and/or from about −10° C. to about −40° C.

An attractive feature of the present subject matter is that it allows creating a variety of hyperbranches by changing the composition of the polymer chain. The polymer chain may include compositionally different polymer chains, compositionally the same polymer chains, and/or combinations of compositionally different and compositionally the same polymer chains. Compositionally different polymer chains include polymer chains of different lengths, different sizes, different chemical structures (linear, branched), different molecular weight, and/or different monomer units (copolymers). Compositionally same polymer chains include polymer chains of substantially same lengths, same sizes, same chemical structures (linear, branched), same molecular weight, and/or same monomer units (homopolymers), Furthermore, a mixed polymer chain hyperbranch can be achieved by condensing two or more compositionally different precursors. An example of compositionally different polymer chains immobilized on the core could result in an amphiphilic silsesquioxane having various ratios of hydrophilic and hydrophobic polymer chains. These systems are particularly interesting because of their intriguing phase behavior. Another example of the formation of compositionally different polymer chains is depicted in FIG. 11. FIG. 11 shows how silsesquioxanes with bulky R groups can be produced when a hydrolyzable silane readily undergoes a one-step condensation reaction with an organic alcohol. Two different polymer chains are bonded to the silsesquioxane core, namely, the polymer chain of the precursor and the polymer chain of the organic alcohol via Si—O—C bond.

Furthermore, it must be noted that variations can also be made at the silsesquioxane core level to produce designer hybrid metallo-silsesquioxane cores by incorporating hydrolyzable metal and metalloids in the hydrolysis-condensation chemistry with the precursor. Silsesquioxane easily co-reacts with a variety of core modifying compounds of the types MX, MX$_2$, MX$_3$, MX$_4$, MX$_5$, MX$_6$, RMX, RMX$_2$, RMX$_3$, RMX$_4$, RMX$_5$, RMX$_6$ in which R=alkyl, alkenyl, aryl, H; M=Al, Si, Ge, Sn, Ti, or Zr; and X=organic monodentate ligand, organic bidentate ligand, organic tridentate ligand, organic ambidentate ligand, halogen or alkoxide. This facile synthetic method with short step(s) and high yield enables a variety of materials with a range of performance properties.

Furthermore, other types of co-reactants used for core level modification include M(X)$_4$ and M(X)$_a$(Z)$_b$ wherein M is as previously noted, X is a hydrolyzable group a is preferably 2, b is preferably 2, and Z is an organic ligand of the general formula A-C(O)—(R')$_n$—C(O)—B wherein R' is a hydrocarbon group, A and B are independently organic groups, and n is from 0 to 10. The noted co-reactant is not particularly restricted but includes, among others, transition metal chelates, titanate esters such as tetrabutyl titanate and tetraisopropyltitanate; organotin compounds and its carboxylic acid metal salts such as dibutyltin dilaurate, dibutyltin diacetylacetonate, dibutyltin maleate, dibutyltin diacetate, dibutyltin dimethoxide; organoaluminum compounds such as aluminum triacetylacetonate, aluminum tri(ethyl acetoacetate) and diisopropoxyaluminum ethyl acetoacetate; organozirconium compounds such as zirconium tetraacetylacetonate, zirconium tetraisopropoxide and zirconium tetrabutoxide. Some examples of appropriate compound(s) are sold under the trade name Tyzor® such as Tyzor® 9000, Tyzor® AA, and Tyzor® GBA by Dorfketal. Tyzor® 9000 has the formula Ti(isopropoxy)$_4$. An illustrative example of a suitable ligand is acetylacetonate, ethylacetoacetate, glycol ethers, alkanolamines, and/or triethanolamine. Other metal chelates may be compounds prepared by coordinating multivalent metals such as Al, Fe, Zn, Sn, Sb, Mg, and V with a suitable ligand such as, for example, acetylacetonate or ethyl acetoacetate.

The mole ratio of metal content M to the silicon content in the hybrid metallo-silsesquioxane is preferably no greater than 30:1, respectively. More preferably, the mole percent is no greater than 20:1. As an illustrative example, without limitation, novel hybrid titanium oxide/silsesquioxane cores were synthesized by hydrolytic co-condensation of titanium alkoxides [Ti (OR')$_4$ R'=ethyl, isopropyl, butyl, and acetylacetonate] with trimethoxysilane bearing precursor. The co-condensation of titanium compounds is a facile reaction at a wide range of feed ratios to produce titania-silica mixed oxides.

Furthermore, core level modification can also be performed by silicon-containing co-reactants. The general formula for silicon-containing co-reactant is given as R''$_{4-q}$Si (OR$^\#$)$_q$ wherein R'' represents a functional or non-functional hydrocarbon group and R$^\#$ represents methyl, ethyl or isopropyl and q has a value of 2 or 3. Non-limiting examples of operative silicon compounds are propyltrimethoxy silane, phenyltrimethoxysilane, methyltriethoxysilane, decyltrimethoxysilane, 3-aminopropyltrimetoxy silane, methyl trimethoxy silane, vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxydimethoxysilane, γ-methacryloxypropyl-methyldimethoxysilane, γ-methacryloxypropylmethyldiethoxysilane, γ-methacryloxymethyl-dimethoxysilane, γ-methacryloxymethyltrimethoxysilane, γ-methacryloxymethyltriethoxy-silane, (methacryloxymethyl) methyldimethoxysilane, (methacryloxymethyl)-methyldiethoxysi lane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-aminopropyltriethoxysilane, γ-glycidoxypropyltriethoxysilane and the like.

Furthermore, tetraalkoxy silanes, $Si(OR^\#)_4$, such as found in tetraethoxy and tetramethoxy silanes are yet other types of co-reactants used for core modification in which $R^\#$ represents methyl, ethyl or the isopropyl group. Under appropriate conditions, these hydrolyze and condense to form glass-like gel structures. Co-condensation of tetraethoxy silane (TEOS) with precursor is a convenient synthetic approach for further tuning of novel silsesquioxane structures such as to modify the solubility, rigidity, modulus, glass transition temperature, and refractive index.

The film forming properties can be adjusted by altering the composition of the precursor and core modifier feed. This novel synthetic strategy provides a means to make designer pressure sensitive adhesives which enables a practitioner in this field of art tremendous latitude to tune performance properties.

Further, regarding the polymer chain of the noted precursor, the polymer chain itself is composed of acrylate and/or methacrylate monomers linked to form linear and/or branched homopolymers and/or copolymers. In many aspects, the pressure sensitive adhesive and/or the hyperbranched polymers include at least about 50% of (meth)acrylate monomers or a majority proportion of (meth)acrylate monomers, segments, and/or branches. Majority proportion being defined as greater than about 50% by weight of the PSA and/or hyperbranched polymers, about 57% by weight of the PSA and/or hyperbranched polymers, greater than about 57% by weight of the PSA and/or hyperbranched polymers, a range of from about 50% to about 99.99% or about 60% to about 99.99% or about 70% to about 99.99% by weight of the PSA and/or hyperbranched polymers. Monomers which are suitable for use in the precursor include C1 to about C20 alkyl, aryl or cyclic acrylates, and may include, but not limited to the following: methyl acrylate, ethyl acrylate, n-propylacrylate, isopropyl acrylate, benzyl acrylate, phenyl acrylate, 2-phenylethyl acrylate, butyl acrylate, isobutyl acrylate, tert-butyl acrylate, n-hexyl acrylate2-ethylhexyl acrylate, isobornyl acrylate, propyl heptyl acrylate, isooctyl acrylate, n-dodecyl acrylate, n-decyl acrylate, isodecyl acrylate, isostearyl acrylate, methoxyethyl acrylate, ethoxyethyl acrylate, cyclohexyl acrylate, 4-tert-butylcyclohexyl acrylate, and functional derivatives of these acrylates such as 2-hydroxy ethyl acrylate, 2-chloroethyl acrylate, and the like. The methacrylate monomers include C1 to about C20 alkyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like.

Furthermore, the acrylate monomers may copolymerize with other comonomers with reactive functional groups such as acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, and mixtures of two or more groups thereof. It is also contemplated to include silyl groups, carboxyl groups, carbonyl groups, carbonate ester groups, isocyanato groups, amino groups, amide groups, imide groups, mercapto groups, and acetoacetyl groups in any combination and/or in combination with one or more of any of the previously noted groups.

Furthermore, the acrylate monomers may copolymerize with comonomers bearing acrylamide groups. These can include acrylamide and its derivatives including the N-substituted alkyl and aryl derivatives thereof. These include N-methyl acrylamide, N,N-dimethyl acrylamide, t-octyl acrylamide, N-aminoethyl acrylate, N-aminoethyl methacrylate, and the like.

Further examples of comonomers include vinyl ester groups such as vinyl acetate, vinyl propionate, vinyl butyrate, vinyl valerate, vinyl versitate, vinyl isobutyrate, and the like.

Further examples of comonomers include vinyl ether groups such as vinyl ethers having 1 to about 8 carbon atoms including ethylvinyl ether, butylvinyl ether, 2-ethylhexylvinyl ether, and the like.

Further examples of comonomers include acid-containing groups such as unsaturated carboxylic acids containing from 3 to about 20 carbon atoms. Preferred groups include acrylic acid, methacrylic acid, vinyl sulfonic acid, itaconic acid, beta carboxyl ethyl acrylate, mono-2-acroyloxypropyl succinate, and the like.

Further examples of comonomers include epoxy groups such as for example, glycidyl methacrylate and glycidal acrylate.

Further examples of comonomers include hydroxyl groups such as hydroxy ethyl acrylate, hydroxyl ethyl methacrylate, hydroxy isopropyl acrylates, hydroxy isopropyl methacrylate, hydroxy butyl acrylate, hydroxy butyl methacrylate and the like.

In one aspect, the acrylic precursor may be formed using a macromonomer (also referred to as "macromer"). The macromonomer may be represented by the general formula:

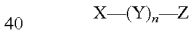

wherein X is a vinyl group copolymerizable with the other monomers present in the precursor composition; Y is a divalent linking group where n can be 0 or 1; Z is a monovalent polymeric moiety having a $T_g$ greater than 20° C. and a weight average molecular weight in the range of about 2,000 to about 30,000.

Various polymerization techniques can be used to produce the precursor including some of the controlled polymerization techniques such as Atom Transfer Radical Polymerization (ATRP); Reversible Addition/Fragmentation Chain Transfer Polymerization (RAFT); and Nitroxide-mediated Polymerization (NMP) or Stable Free Radical Polymerization (SFRP) developed in recent years. Additionally, other techniques stem from the development of new catalyst and initiating systems. Although these methods can be applied to produce the desired precursor, these were generally found to be cumbersome multistep procedures. Furthermore, it was unexpectedly discovered that acrylate and/or methacrylate monomers polymerized in the presence of a free-radical initiator and a silane-bearing chain transfer agent (CTA) at certain mole ratios of initiator to CTA successfully produced the desired precursor architecture in one single step, thus simplifying the process considerably.

A variety of free-radical initiators are known and can potentially be incorporated in the present subject matter compositions. The general class of free-radical initiators belong to the classes of ketone peroxide, diacyl peroxides, dialkyl peroxides, peroxyesters, peroxyketals, peroxydicarbonates, peroxymonocarbonates, and diazo compounds. Each class of preceding compound functions as a thermal initiator by absorbing heat energy delivered in the form of convection, conduction or radiation. Another general class of free-radical initiators belongs to the classes of α-hydroxyalkylphenones, α-aminoalkylphenones, benzyl ketals, benzoin ethers, α-dialkoxyacetophenones, and acylphosphineoxides. Each class of the preceding compound functions as a photoinitiator by absorbing energy within the UV/visible region of the electromagnetic spectrum. The initiators falling in the above two listed categories will be particularly useful in the synthesis of precursor as long as each of the radical fragments formed in the initiation step have the following general structures:

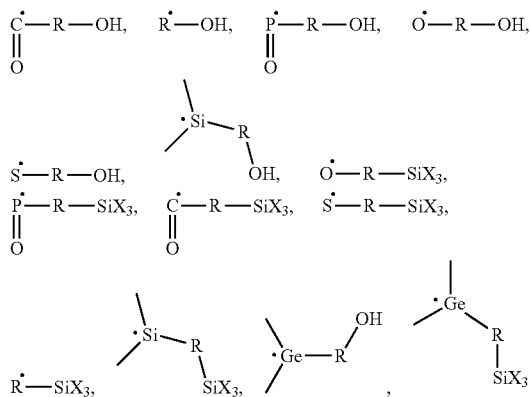

In these structures, R represents a hydrocarbon fragment. It must be noted that in many aspects of the present subject matter synthetic strategy, each radical fragment formed on initiation preferably bears a hydroxyl group or a hydrolyzable silane group. Some examples of commercially available initiators conforming to the desired structures, but not limited to these are 2,2'-Azobis[2-methyl-N-(2-hydroxyethyl) propioamide], 2,2' Azobis[1-(4-hydroxyphenyl)ethane], bis (2-hydroxyethyl) peroxide, and 2-Hydroxy-4'-(2-hydroxyethoxy)-2-methylpropiophenone.

Useful chain transfer agents comprise various mercapto-based compounds. In many aspects, the presence of a hydrolyzable silane moiety on the chain transfer agent is an essential part of the synthetic strategy for preparing the precursor. The general structure of the chain transfer agent is:

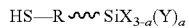

in which R is an organic linking group situated between a thiol and a hydrolyzable silane moiety, Y is an organofunctional group, and the value of 'a' is selected from the group consisting of 0, 1, 2, and combinations thereof. In one aspect, the value of 'a' is either 0 or 1, and more preferably the value of 'a' is 0. In certain aspects, to achieve the desired structure of the precursor it is required that the chain transfer agent bear a single thiol group and a single silane group per molecule. Examples of the mercapto group-containing silanes include mercaptoalkyltrialkoxysilanes such as mercaptomethyltrimethoxysilane, mercaptomethyltriethoxysilane, β-mercaptoethyltrimethoxysilane, β-mercapto-ethyltriethoxysilane, β-mercaptoethyltripropoxysilane, β-mercaptoethyltriisopropoxysilane, β-mercaptoethyltributoxysilane, γ-mercaptopropyltrimethoxysilane, γ-mercaptopropyltriethoxysilane, γ-mercaptopropyltripropoxysilane, γ-mercaptopropyltriisopropoxysilane, and γ-mercaptopropyltributoxysilane; (mercaptoalkyl)alkyldialkoxysilanes such as β-mercaptoetyylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, β-mercaptopropylmethyldiisopropropoxysilane, γ-mercaptopropylmethyldibutoxysilane, γ-mercaptopropylethyldimethoxysilane, γ-mercaptopropylethyldiethoxysilane, γ-mercaptopropylethyldipropoxysilane, γ-mercaptopropylethyldiisopropoxysilane and γ-mercaptopropylethyldibutoxysilane.

Some such commercially available chain transfer agents, are as follows but not limited to:

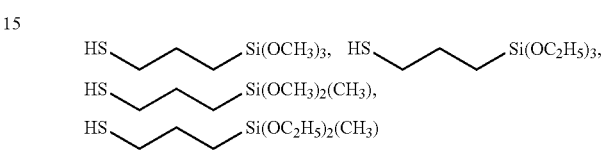

Although not wishing to be bound by any particular theory, it is believed that in many aspects of the present subject matter, an extremely low amount of initiator must be used to initiate the polymerization reaction in relation to the chain transfer agent specified in the present subject matter. Under these conditions, immediately after the initiation of polymerization, the chain transfer agent takes over whereby it terminates a propagating chain but recycles by generating a new sulfur centered radical that is available for further and very efficient initiation to start the next chain. It was discovered that by keeping the mole ratio of the initiator to chain transfer agent very low, an overwhelming number of polymer chains are actually initiated by the chain transfer agent. Because the chain transfer agent used herein bears a silane moiety, consequently each chain initiated by the chain transfer agent also bears a terminal silane group.

In many aspects, a successful strategy uses the noted chain transfer agent in conjunction with the noted free-radical initiator. The mole ratio of the chain transfer agent to initiator is an important consideration for the synthesis of the desired precursor architecture. By manipulating the ratio of initiator to the chain transfer agent, the ratio of polymer chains bearing terminal hydroxyl to silane groups can be controlled with relative ease. A higher ratio will ensure more chains with terminal silane group. However, a higher ratio will also reduce the molecular weight of the precursor. Not all combinations of the two will deliver a favorable outcome. In many aspects, the mole ratio of chain transfer agent to initiator can range from about 200:1 to about 1:2. Such a combination ensures that substantially all polymer chains have either a terminal hydroxyl group or a terminal silane group.

The precursor can be synthesized in solvent medium or solvent-free (bulk). At a minimum, the monomers, initiator(s), and chain transfer agent(s) are dissolved in an inert theta solvent and polymerized to form the precursor. Alternatively, at a minimum, the monomers, initiator(s), and chain transfer agent(s) are polymerized in the absence of solvent to form the precursor.

Synthesis of the precursor can be initiated thermally or photochemically or any combination of the two through free-radical mechanism(s). The present subject matter adhesives and/or precursor compositions comprise a free-radical initiator and in particular aspects an actinic radiation activated initiator. In other aspects the actinic radiation activation can be substituted by a thermally activated initiator.

However, it will be understood that the present subject matter includes the use of nearly any type of initiator and is not limited to α-cleavage or hydrogen abstraction types. For example, a variety of initiators are known that decompose or cleave into free-radicals upon exposure to heat or light, and more particularly UV radiation.

The hyperbranched pressure sensitive adhesive composition may further comprise in addition to the precursor, an oligomer having at least one crosslinkable functional group. The oligomer is typically liquid at room temperature (about 25° C.). Examples of useful oligomers include those having a backbone comprising polyether, polyisobutylene, amorphous poly-alpha olefins, polybutadienes, polyisoprenes, polydimethylsiloxanes, polyalkyloxazolines, polyesters, poly(methyl)acrylates, polyurethanes, and mixtures thereof. The polyether backbones may comprise, for example, polypropylene oxide, polyethylene oxide, polytetramethylene ether glycol. The poly(methyl)acrylate backbones may comprise $C_1$ to $C_{30}$ (meth)acrylate esters that may or may not include modifying monomers. Onto the oligomer backbone there is attached one or more reactive functional groups. The reactive functional groups may comprise silyl, hydroxyl, carboxyl, isocyanato, vinyl, (meth)acryl, epoxy, amino, mercapto and acetoacetyl groups. The functional group chosen for the oligomer may be reactive with a corresponding group on the hyperbranched polymer. The specific functional groups used may be determined by one skilled in the art. For example, amino groups will react with isocyanato, epoxy, and acetoacetyl groups; isocyanoto groups will crosslink with carboxyl, amino and hydroxyl groups; (meth)acryl groups will crosslink with amino and acetoaceyl groups; and epoxy groups will crosslink with amino, carboxyl and hydroxyl groups; etc.

Optionally, a tackifier may be combined with the inventive precursor. The tackifier is substantially compatible with the precursor. As used herein, the term 'substantially compatible' means that when the tackifier and the precursor are combined, the resulting combination is substantially transparent in dry film format, as opposed to opaque, on normal visual inspection. A wide variety of tackifiers can be used to enhance the tack and peel of the adhesive. These include rosins and rosin derivatives including resinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, phenol modified terpene resins like alpha pinene, beta pinene, dipentene, limonene, myrcene, bornylene, camphene, and the like. Various aliphatic hydrocarbon resins like Escorez 1304, manufactured by Exxon Chemical Co. and the aromatic hydrocarbon resins based on C9, C5, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by SI Group Inc., YS Polyster UH115, manufactured and sold by Yasuhara Chemical Co. Ltd., and Sylvares TP 2040, manufactured and sold by Kraton Corporation, are particularly useful tackifiers for the present subject matter. Various mixed aliphatic and aromatic resins, such as Zonatac NG 98, manufactured and sold by Kraton Corporation can be used.

While the resins described above are useful for tackifying the precursor/oligomer blend of the present subject matter, the particular tackifying resin and/or amounts selected for a given formulation may depend upon the chemical nature of the polymeric system being tackified. Many resins which are known in the prior art as being useful for tackifying acrylic based pressure sensitive adhesives can be effectively used in the practice of the present subject matter, although the scope of the present subject matter is not limited to only such resins. Resins described in Satas, Handbook of Pressure Sensitive Adhesive Technology, Von Nostrand Reinhold, Co., Chap 20, pages 527-584 (1989) could potentially be used.

In addition to pressure sensitive adhesives and tapes, the compositions may be used to form foam articles such as foam carriers and tapes, and foam adhesives. In one aspect, a foam article is formed from a blend comprising (a) the precursor, (b) the liquid oligomer and (c) expandable microspheres or a blowing agent. The microspheres may be expandable microspheres such as EXPANCEL® expandable microspheres available from Expancel, Inc. These microspheres are small spherical rubber particles. The microspheres include a polymer shell encapsulating crystals of blowing agent. When the particles are heated, the blowing agent within the particle decomposes to releases gas which goes on to expand the microspheres like a balloon. The expanded spheres within the adhesive article give rise to a foamed structure.

Blowing agents can also be used for making foamed articles. Blowing agents can be selected from a broad range of materials, including physical and chemical blowing agents. Physical blowing agents such as hydrocarbons, ethers, esters and the like may include, for example, volatile liquids or compressed gasses that are dissolved in a polymer and change state during processing. When physical blowing agents are included in adhesive, the change in state may create pores. The chemical blowing agents function by thermally decomposing during processing to liberate gasses that form foam. The chemical blowing agent may be a hydrazine derivative that generates nitrogen in an exothermic reaction. These chemical blowing agents include, but are not limited to, azodicarbonamide, sulfonyl hydrazides, p-toluene semicarbazides, tetrazoles, substituted azonitrile compounds, and benzoxazines.

The pressure sensitive adhesive composition comprising the precursor and the blowing agent/EXPANCEL® is mixed thoroughly followed by coating on a substrate at a desired coat weight. Depending on the viscosity of the blend, it could be either coated at a temperature range of about 20° C. to about 50° C., or at elevated temperature range of about 51° C. to about 170° C., or from a solution of the blend in suitable solvent. The coating is subjected to thermal treatment in an oven to activate the foaming agent and condensation reaction. The residence time in the oven is adjusted on a case by case basis to allow condensation reaction(s) to continue until the desired cohesive strength is achieved. In many aspects, a pressure sensitive adhesive thus obtained has high cohesive strength at room and at elevated temperatures range of about 80° C. to about 200° C.

The pressure sensitive adhesives of the present subject matter may further comprise additives such as pigments, fillers, plasticizers, diluents, antioxidants, and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, cristobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants and, unexpectedly, for improving cohesive strength, particularly at elevated temperatures (about 80° C. to about 200° C.). These metal oxides also can potentially react with the silane core. It is contemplated that the silane would condense and grow around the surface of metal oxide particle leading to total encapsulation.

A condensation catalyst may be used to speed up the reaction leading up to core formation. The condensation catalyst is not particularly restricted but includes, among others, organotin compounds and their carboxylic acid metal salts such as dibutyltin dilaurate, dibutyltin diacetylacetonate, dibutyltin maleate, dibutyltin diacetate, dibutyltin dimethoxide; organoaluminum compounds such as aluminum triacetylacetonate, aluminum tri(ethyl acetoacetate) and diisopropoxyaluminum ethyl acetoacetate; organozirconium compounds such as zirconium tetraacetylacetonate, zirconium tetraisopropoxide and zirconium tetrabutoxide; titanate esters such as tetrabutyl titanate and tetraisopropyltitante; amine compounds such as butylamine, octylamine, dibutylamine, monoethanolamine, diethanolamine, triethanolamine, diethylenetriamine, triethylenetetramine, oleylamine, guanidine, diphenylguanidine, N-methylmorpholine, and 1,3-diazabicyclo[5.4.6]-undecene-7. The addition amount of the noted condensation catalyst is optional but can be as high as 10% by weight to precursor weight.

Incorporation of stabilizer is optional in the present subject matter. It is possible to modify the pot stability of the precursor against premature condensation during storage, handling and dispensing steps. These stabilizers include, but not limited to, alcohols such as methanol, ethanol, isopropanol, and butanol; orthoesters such as trimethyl orthoacetate, triethyl orthoformate, methyl orthoformate; oxazolidine compounds such as 3-ethyl-2-methyl-2-(3-methylbutyl)-1,3-oxazolidine; vinyltrimethoxysilane; and carboxylic acids such as 2-ethylhexanoic acid. The stabilizer may be added to the precursor in amounts of about 0.01% to about 15% by weight, or 0.1% to about 5% by weight, or about 0.5% to about 3% by weight.

In many aspects, the present subject matter provides methods of forming a pressure sensitive adhesive with hyperbranched silsesquioxane topology using a thermal process. The methods typically comprise a two-step process. A first step forms a precursor by providing a composition including at least one monomer having one or more ethylenically unsaturated bonds, a thermal initiator, and a chain transfer agent, subjecting the composition to the activation temperature of the initiator until the polymerization is substantially complete. Step one can be conducted either in a solvent of solvent-free environment. A second step comprise mixing at least the precursor obtained in the first step and a hydrolysis/condensation catalyst; casting the mixture on a carrier web followed by subjecting the composition to elevated temperature(s) range of about 51° C. to about 200° C. thereby forming the adhesive of the present subject matter.

In many aspects, the present subject matter provides methods of forming a pressure sensitive adhesive with hyperbranched silsesquioxane topology using actinic radiation. The methods comprise the two step process, the first to form a precursor by providing a composition including at least one monomer having one or more ethylenically unsaturated bonds, an actinic radiation initiator, and a chain transfer agent, and exposing the composition to actinic radiation at the activation wavelength(s) of the initiator until the polymerization is substantially complete. Step one can be conducted in solvent or solvent-free environment. A second step comprise mixing at least the precursor obtained in first step and a hydrolysis/condensation catalyst; casting the mixture on a carrier web followed by subjecting the composition to elevated temperature(s) range of about 51° C. to about 200° C. thereby forming the adhesive of the present subject matter.

The present subject matter also provides methods of forming a melt processable composition resulting in the pressure sensitive adhesive with hyperbranched silsesquioxane topology. In many aspects, the methods utilize a solvent-free precursor comprised substantially of a silane group located on one terminal end of the precursor. The methods additionally comprise admixing the precursor, with the hydrolysis/condensation catalyst to thereby form a melt processable composition. The methods also comprise casting the composition on a carrier web followed by subjecting the composition to elevated temperature(s) range of about 51° C. to about 200° C. thereby forming the adhesive of the present subject matter.

The methods also comprise admixing one or more constitutionally different precursors thereby forming a pre-adhesive composition. The different precursors include a silane group located on one terminal end of the precursor. The methods additionally comprise blending the precursor blend with the hydrolysis/condensation catalyst. The methods also comprise casting the composition on a carrier web followed by subjecting the composition to elevated temperature(s) range of about 51° C. to about 200° C. thereby forming the adhesive of the present subject matter.

The methods also comprise blending the precursor or a mixture of precursors with core modifiers thereby forming a pre-adhesive composition. The methods additionally comprise blending the precursor-core modifier mixture with the hydrolysis/condensation catalyst to thereby form the pressure sensitive adhesive composition. The methods also comprise casting the composition on a carrier web followed by subjecting the composition to elevated temperature(s) (about 51° C. to about 200° C.) thereby forming the adhesive of the present subject matter.

The pressure sensitive adhesives may be used in adhesive articles such as labels, tapes, sheets, decorative appliqués, and the like. In many aspects, the articles comprise a substrate having at least one face and the pressure sensitive adhesive disposed in a layer form on at least a portion of the face of the substrate. Suitable substrates serving as web carriers or adhesive carriers or facestocks to which the adhesive may be applied include non-woven materials, such as, for example, paper, plastic, metal or foam; and woven materials, such as, for example woven cotton or woven synthetic polymers, natural textiles, and synthetic textiles. Non-limiting examples of synthetic polymers include polyethylene, polypropylene, polyvinyl chloride, polyester and polyamide. The adhesive may be applied to the substrate by any conventional method, including extrusion, spraying, roll coating, curtain coating, etc.

The present subject matter provides a wide array of articles that include the noted compositions, precursors, and/or adhesives. Examples of such articles include adhesive sheets, foils, films, and tapes including double sided, single sided, and transfer tapes; label stock; label constructions; automotive component bonding, wire harness tapes, permanent fastening adhesives, optically clear adhesives, electronics applications, medical applications, packaging products and assemblies including food packages, packaging for household goods and industrial goods; and other items.

Figure 16:
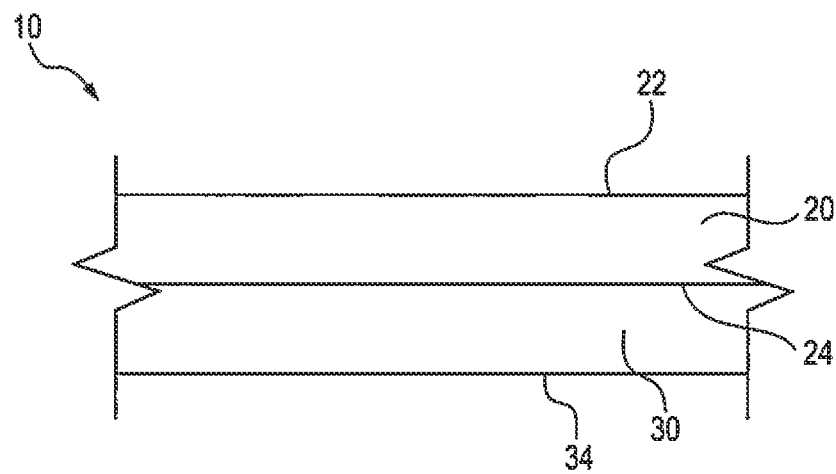
FIG. 16 is a schematic cross sectional illustration of an article having a layer of a pressure sensitive adhesive.
Figure 17:
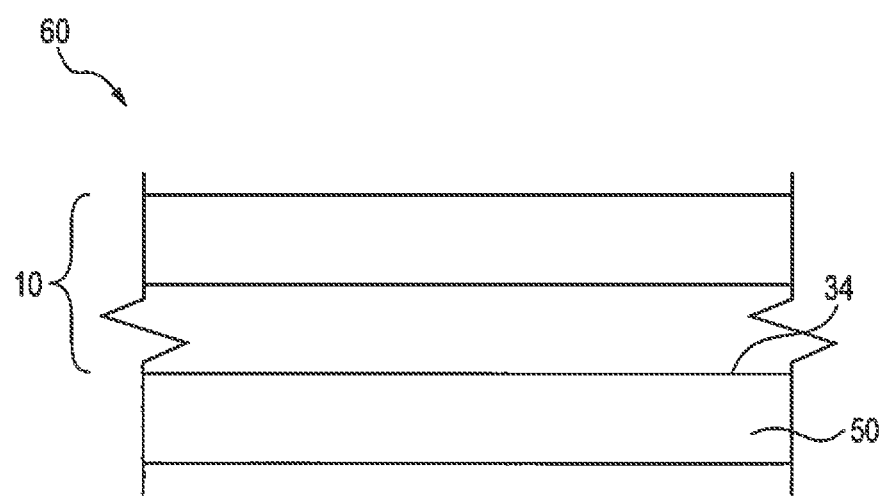
FIG. 17 is a schematic cross sectional illustration of another article having a layer of a pressure sensitive adhesive.

FIGS. 16 and 17 are schematic cross sectional view of representative aspect articles 10 and 60 in accordance with the present subject matter. The article 10 comprises a substrate or material 20 defining faces 22 and 24. A layer or region of pressure sensitive adhesive 30 is disposed on at least one of the faces such as face 24. The pressure sensitive adhesive is as described herein and typically comprises a hyperbranched polymer that includes a silsesquioxane core and/or a metallo-silsesquioxane core. The layer of PSA 30 typically defines an exposed face 34 for adhesion. The article 60 shown in FIG. 17 can include the article 10 of FIG. 16 and one or more protective release liners 50 that at least partially cover the exposed face 34 of the PSA. Release liners are well known in the art and so are not described herein.

Many other benefits will no doubt become apparent from future application and development of the present subject matter. Discovery of the unique properties of hyperbranched polymers has led to rapid development in the field during the past decade but no activity in pressure sensitive adhesives. Topological specifics of hyperbranched polymers responsible for their most important peculiar properties have been studied. Among those are high level of solubility and thermodynamic compatibility, low viscosity of solutions, resistance to aggregation in solutions (including concentrated solutions), and ability to function as nano-containers for substances sorbed inside macromolecules. The main topological feature of hyperbranched polymers is high-volume concentration of chain units inside macromolecules as a consequence of branching without cross-linking. Also, this volume concentration increases as the degree of branching increases. Hence, hyperbranched polymers are characterized by weak dependence (as compared to linear polymers) of hydrodynamic volume of macromolecules upon molecular weight, because the higher the molecular weight, the more compact the molecular packing. Such compact packing of hyperbranched polymers and the large number of free ends of chains with functional groups on their periphery represent the main structural and physical reason for the unique properties. A benefit pertinent to adhesives of the present subject matter involves the ability to process without the use of solvents, and the capability to achieve high peel, shear, and thermal resistance. For example, a disadvantage of many conventional linear polymer-based PSAs, branched-linear PSAs, and randomly crosslinked adhesive networks is that peel and shear cannot increase simultaneously. One comes at the cost of the other thus limiting the adhesive and/or its performance. The present subject matter provides a means to overcome these limitations of conventional PSAs.

EXAMPLES

The following test methods as set forth below in Table 1 were used for evaluating the adhesive properties of various compositions described below.

TABLE 1

| Tape Performance Test Methods | |
|---|---|
| Test | Condition |
| 180° Peel | a. Peel: sample applied to a stainless steel panel with a 5 pound roller with 1 pass in each direction. Samples conditioned and tested at 23° C. |
| Shear Strength | a. Room temperature shear: 1 Kg weight with a 0.5 inch by 0.5 inch overlap. Sample applied to stainless steel panel with a 5 pound roller with 1 pass in each direction. Samples conditioned and tested at 23° C. |

In order to further illustrate aspects of present subject matter, the following examples are provided. The following examples are intended only to illustrate methods and aspects in accordance with the present subject matter, and as such should not be construed as imposing limitations upon the claims.

Synthesis of the Precursor

Example 1

10 g of n-butyl acrylate, 0.001 g of 2-Hydroxy-4'-(2-hydroxyethoxy)-2-methylpropiophenone, and 0.012 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 2

10 g of n-butyl acrylate, 0.005 g of 2-Hydroxy-4'-(2-hydroxyethoxy)-2-methylpropiophenone, and 0.012 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 3

10 g of n-butyl acrylate, 0.0028 g of 2-Hydroxy-4'-(2-hydroxyethoxy)-2-methylpropiophenone, and 0.04 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 4

7.5 g of n-butyl acrylate, 2.5 g of Isobornyl acrylate, 0.002 g of 2-Hydroxy-4'-(2-hydroxyethoxy)-2-methylpropiophenone, and 0.03 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 5

5.8 g of n-butyl acrylate, 4.2 g t-butyl acrylate, 0.002 g of 2-Hydroxy-4'-(2-hydroxyethoxy)-2-methylpropiophenone, and 0.03 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 6

4.9 g of n-butyl acrylate, 2.1 g t-butyl acrylate, 0.0014 g of 2-Hydroxy-4'-(2-hydroxyethoxy)-2-methylpropiophenone, and 0.035 g of 3-mercaptopropyltrimethoxysilane were charged in a glass reactor. The contents of the reactor were inerted with nitrogen for 5 minutes. Then the contents were exposed to UV radiation of 365 nm for 4 hr to produce the precursor in high yield.

Example 7

3.66 g of methyl methacrylate, 4.53 g of n-butyl acrylate, 1.0 g of 2-hydroxyethyl methacrylate, and 1.2 g of 3-mercaptopropyltrimethoxysilane, 0.15 g of azobisisobutyronitrile, and 45 ml of tetrahydrofuran were charged in a glass reactor. The contents of the reactor were inerted with nitrogen for 5 minutes. The mixture was warmed at 60° C. for 6 hours. The solvent was removed in a rotary evaporator to produce the precursor in high yield.

In Table 2, conversion was determined by gas chromatography and molecular weights by gel permeation chromatography. The samples were dissolved in tetrahydrofuran (THF) at about 0.2% by weight. The samples were then injected in the GPC instrument which used THF as the Mobile phase. The column was calibrated using polystyrene standards. Toluene was used as the internal standard.

TABLE 2

Conversion, Molecular Weights, and Polydispersity (PDI) of Examples 1-7

| Example | Conversion (%) | $M_n$ | $M_w$ | $M_z$ | PDI |
|---|---|---|---|---|---|
| 1 | 98.6 | 88,024 | 315,880 | 787.970 | 3.6 |
| 2 | 99.8 | 65,748 | 267,390 | 693,470 | 4.1 |
| 3 | 98.7 | 30,078 | 94,174 | 233,710 | 3.1 |
| 4 | 99.2 | 59,495 | 164,300 | 406,120 | 2.8 |
| 5 | 99.6 | 60,959 | 313,800 | 1,138,100 | 5.1 |
| 6 | 99.7 | — | — | — | — |
| 7 | 99.8 | 1,724 | 2,900 | 4,226 | 1.7 |

Synthesis of Hyperbranched Silsesquioxane Pressure Sensitive Adhesives

Example 8

10 g of precursor 7 was dissolved in 2 g ethyl acetate. Then 0.015 g of Tyzor AA 105 was added to precursor solution. The solution was cast on a silicone release liner followed by drying in a convection oven at 150° C. for 5 minutes. Upon drying, the resulting material was a non-tacky coating and exhibited a DSC measured Tg of 12.5° C. and a DMA measured shear modulus of $1 \times 10^8$ dynes/cm$^2$, both values being outside the range of PSAs.

Example 9

10 g of precursor 4 was dissolved in 5 g ethyl acetate. Then 0.015 g of Tyzor AA 105 was added to precursor solution. The solution was cast on a silicone release liner followed by drying in a convection oven at 150° C. for 5 minutes to obtain pressure sensitive adhesive in transfer tape format.

Example 10

10 g of precursor 5 was dissolved in 5 g ethyl acetate. Then 0.015 g of Tyzor AA 105 was added to precursor solution. The solution was cast on a silicone release liner followed by drying in a convection oven at 150° C. for 5 minutes to obtain pressure sensitive adhesive in transfer tape format.

Further testing demonstrated that the shear modulus and the glass transition temperature of material in Example 8 was outside the PSA range.

TABLE 3

Peel and Shear Performance of Hyperbranched Silsesquioxane Pressure Sensitive Adhesives

| Example | Peel (180° on stainless steel) lb/in | Shear (0.5" × 0.5", 1 kg) minutes |
|---|---|---|
| 8 | Non-tacky | Non-tacky |
| 9 | 9.20 | 25 |
| 10 | 3.30 | 2130 |

Synthesis of Hybrid Hyperbranched Metallo-Silsesquioxane Pressure Sensitive Adhesives Example 11

10 g of precursor 6 was dissolved in 3.5 g ethyl acetate and 1.5 g isopropyl alcohol. Then 0.55 g of Tyzor AA 105 was added to precursor solution. The solution was cast on a silicone release liner followed by drying in a convection oven at 150° C. for 5 minutes to obtain pressure sensitive adhesive in transfer tape format.

TABLE 4

Peel and Shear Performance of Hyperbranched Metallo-Silsesquioxane Pressure Sensitive Adhesives

| Example | Peel (180° on stainless steel) lb/in | Shear (0.5" × 0.5", 1 kg) minutes |
|---|---|---|
| 11 | 3.7 | >30,000 |

GPC analysis is a good technique to estimate the number of silicon atoms in the silsesquioxane core. The condensed species is solubilized in the GPC solvent followed by molecular weight determination of the sol portion. By comparing the molecular weight of the precursor with that of the condensed species is a direct indication of the number of silicon atoms in the core. This number typically spanned between 6 and 8 in the above examples. However, it will be understood that in no way is the present subject matter limited to this range.

Many other benefits will no doubt become apparent from future application and development of this technology.

Further examples consistent with the present teachings are set out in the following number clauses.

Clause 1. A polymer comprising a hyperbranched polymer, the hyperbranched polymer comprising at least one silsesquioxane core and at least two polymer chains chemically bound to each of said silsesquioxane core.

Clause 2. The polymer of clause 1 wherein the silsesquioxane core is selected from the group consisting of a pure silsesquioxane core, a hybrid silsesquioxane core, and combinations thereof.

Clause 3. The polymer of any one of clauses 1-2 wherein the silsesquioxane core is selected from the group consisting of a fully condensed core, a partially condensed core, and combinations thereof.

Clause 4. The polymer of any one of clauses 1-3 wherein the silsesquioxane core comprises a hybrid core having one or more of the Si atoms in the core substituted with atom M of a core modifier, the core modifier having a formula selected from the group consisting of MX, $MX_2$, $MX_3$, $MX_4$, $MX_5$, $MX_6$, RMX, $RMX_2$, $RMX_3$, $RMX_4$, $RMX_5$, and $RMX_6$, in which R is selected from the group consisting of alkyl, alkenyl, aryl, H, and combinations thereof, M is independently selected from Al, Si, Ge, Sn, Ti, and Zr, and X is selected from the group consisting of organic monodentate ligand, organic bidentate ligand, organic tridentate ligand, organic ambidentate ligand, halogen, alkoxide, and combinations thereof.

Clause 5. The polymer of any one of clauses 1-4 wherein the silsesquioxane core comprises a hybrid core having one or more of the Si atoms in the core substituted with atom M of a core modifier, the core modifier having a formula selected from the group consisting of $M(X)_4$ and $M(X)_a(Z)_b$ in which M is independently selected from Al, Si, Ge, Sn, Ti, and Zr, a is 2, b is 2, X is a hydrolyzable group, Z is an organic ligand of the formula A-C(O)—(R')$_n$—C(O)—B wherein R' is an organic group and n is an integer from 0 to 10, A is an organic group, and B is an organic group.

Clause 6. The polymer of any one of clauses 1-5 wherein the silsesquioxane core comprises a hybrid core having one or more of the Si atoms in the core substituted with another Si atom of a core modifier, the core modifier having a formula $R''_{4-q}Si(OR\#)_q$ wherein R'' is a functional or non-functional hydrocarbon group, R# is selected from the group consisting of methyl, ethyl, and isopropyl, and q is 2 or 3.

Clause 7. The polymer of any one of clauses 1-6 wherein the silsesquioxane core comprises a hybrid core having one or more of the Si atoms in the core substituted with another Si atom of a core modifier, the core modifier having a formula $Si(OR\#)_4$ in which R# is selected from the group consisting of methyl, ethyl, and isopropyl.

Clause 8. The polymer of any one of clauses 1-7 wherein each of the polymer chains comprises polymers selected from the group consisting of compositionally different polymer chains, compositionally the same polymer chains, and combinations thereof.

Clause 9. The polymer of any one of clauses 1-8 wherein the polymer chain does not contain any ethylenic unsaturation or acrylate unsaturation along the backbone of the polymer chain.

Clause 10. The polymer of any one of clauses 1-9 wherein the polymer chain comprises (meth)acrylate monomers linked to form polymers selected from the group consisting of linear homopolymers, branched homopolymers, linear copolymers, branched copolymers, and combinations thereof.

Clause 11. The polymer of any one of clauses 1-10 wherein at least one of the hyperbranched polymer and the polymer comprises at least about 50% by weight of (meth)acrylate monomers.

Clause 12. The polymer of any one of clauses 1-11 further including an oligomer having at least one crosslinkable functional group.

Clause 13. The polymer of clause 12 wherein the oligomer is a liquid at room temperature.

Clause 14. The polymer of any one of clauses 12-13 wherein the oligomer has a backbone selected from the group consisting of polyether, polyisobutylene, amorphous poly-alpha olefins, polybutadienes, polyisoprenes, polydimethylsiloxanes, polyalkyloxazolines, polyesters, poly(methyl)acrylates, polyurethanes, and combinations thereof.

Clause 15. The polymer of any one of clauses 1-14 further including a tackifier.

Clause 16. The polymer of any one of clauses 1-15 wherein the silsesquioxane core is a pure silsesquioxane core.

Clause 17. The polymer of any one of clauses 1-16 wherein the pure silsesquioxane core comprises only fully condensed cores.

Clause 18. The polymer of any one of clauses 1-16 wherein the pure silsesquioxane core comprises only partially condensed cores.

Clause 19. The polymer of any one of clauses 1-16 wherein the pure silsesquioxane core comprises a combination of fully condensed cores and partially condensed cores.

Clause 20. The polymer of any one of clauses 1-15 wherein the silsesquioxane core is a hybrid silsesquioxane core.

Clause 21. The polymer of any one of clauses 1-15 and 20 wherein the hybrid silsesquioxane core comprises only fully condensed cores.

Clause 22. The polymer of any one of clauses 1-15 and 20 wherein the hybrid silsesquioxane core comprises only partially condensed cores.

Clause 23. The polymer of any one of clauses 1-15 and 20 wherein the hybrid silsesquioxane core comprises a combination of fully condensed cores and partially condensed cores.

Clause 24. The polymer of any one of clauses 1-15 wherein the silsesquioxane core comprises a combination of pure silsesquioxane cores and hybrid silsesquioxane cores.

Clause 25. The polymer of any one of clauses 1-15 and 24 wherein the combination of pure silsesquioxane and hybrid silsesquioxane cores comprises only fully condensed cores.

Clause 26. The polymer of any one of clauses 1-15 and 24 wherein the combination of pure silsesquioxane and hybrid silsesquioxane cores comprises only partially condensed cores.

Clause 27. The polymer of any one of clauses 1-15 and 24 wherein the combination of pure silsesquioxane and hybrid silsesquioxane cores comprises a combination of fully condensed cores and partially condensed cores.

Clause 28. The polymer of any one of clauses 1-27 wherein the silsesquioxane core comprise Si atoms attached to at least one of three oxo groups and two oxo groups.

Clause 29. The polymer of any one of clauses 1-28 wherein the silsesquioxane cores have the general formula $[RSiO_{3/2}]_n$ where n is an even number and R is selected from the group consisting of alkyl, aryl, heterocarbon, polymer, oligomer, (meth)acrylate polymer, (meth)acrylate oligomer, and combinations thereof.

Clause 30. The polymer of any one of clauses 1-29 wherein a majority of silsesquioxane cores have the general formula $[RSiO_{3/2}]_n$ where n is an even number and R is selected from the group consisting of alkyl, aryl, heterocarbon, polymer, oligomer, (meth)acrylate polymer, (meth)acrylate oligomer, and combinations thereof.

Clause 31. The polymer of any one of clauses 1-28 wherein the silsesquioxane cores have the general formula $[R-SiO_{3/2}]_n(H_2O)_{(3n/2)-x}$ where 'n' is a positive integer, 'x' is a positive integral value less than or equal to 3n/2, and R is selected from the group consisting of alkyl, aryl, heterocarbon, polymer, oligomer, (meth)acrylate polymer, (meth)acrylate oligomer, and combinations thereof.

Clause 32. The polymer of any one of clauses 1-28 and 30 wherein a majority of silsesquioxane cores have the general formula $[R-SiO_{3/2}]_n(H_2O)_{(3n/2)-x}$ where 'n' is a positive integer, 'x' is a positive integral value less than or equal to 3n/2, and R is selected from the group consisting of alkyl, aryl, heterocarbon, polymer, oligomer, (meth)acrylate polymer, (meth)acrylate oligomer, and combinations thereof.

Clause 33. The polymer of any one of clauses 2-15 and 20-30 wherein the hybrid silsesquioxane core is a metallo-silsesquioxane core.

Clause 34. The polymer of any one of clauses 1-33 wherein the silsesquioxane core is in at least one of a caged form, polymeric form, and combinations thereof.

Clause 35. The polymer of any one of clauses 1-34 wherein each one of the silsesquioxane cores of a portion of the hyperbranched polymers is serially and covalently linked to another silsesquioxane core to form a pearl chain structure.

Clause 36. The polymer of clause 35 wherein the link comprises a polyol having a structure

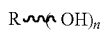

where R is a spacer group situated between the OH groups, and n is selected from the group consisting of 2, 3, 4, and combinations thereof.

Clause 37. The polymer of any one of clauses 1-34 wherein each one of the silsesquioxane cores of a portion of the hyperbranched polymers is covalently linked to other one or more silsesquioxane cores to form a multidimensional network structure.

Clause 38. The polymer of clause 37 wherein the link comprises a hydrolyzable di-silane having a structure

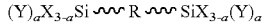

where R is an organic group situated between the two hydrolyzable silane moieties, X is a hydrolyzable group, Y is an organofunctional group, and each 'a' is independently selected from 0, 1, and 2.

Clause 39. The polymer of any one of clauses 37-38 wherein the multidimensional network is a two dimensional structure.

Clause 40. The polymer of any one of clauses 1-39 wherein the number average molecular weight (Mn) of the polymer is within a range of from about 20,000 to about 1,000,000 g/mole.

Clause 41. The polymer of any one of clauses 1-40 wherein the polymer is free of crosslinking.

Clause 42. The polymer of any one of clauses 1-41 wherein the polymer exhibits a glass transition temperature (Tg) of from about 10° C. to about −60° C. as determined by differential scanning calorimetry (DSC).

Clause 43. The polymer of any one of clauses 1-42 wherein the polymer exhibits a plateau shear modulus at 25° C. and 1 radian per second that is between $5 \times 10^4$ and $6 \times 10^6$ dynes/cm$^2$ as determined by dynamic mechanical analysis (DMA).

Clause 44. A pressure sensitive adhesive comprising the polymer of any one of clauses 1-43.

Clause 45. An article comprising a pressure sensitive adhesive of clause 44.

Clause 46. The article of clause 45 further comprising:
a substrate defining a face;
wherein the pressure sensitive adhesive is disposed on at least a portion of the face of the substrate.

Clause 47. A method of forming a polymer comprising the steps of:
providing a precursor having a formula:

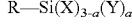

wherein R is one of a nonhydrolyzable organic group, a nonhydrolyzable oligomer chain, and a nonhydrolyzable polymer chain, X is a hydrolyzable group, Y is an organofunctional group, and the value of "a" is selected from the group consisting of 0, 1, 2, and combinations thereof;
subjecting the precursor to a hydrolysis and a condensation reaction or only a condensation reaction to thereby form a hyperbranched polymer that comprises a silsesquioxane core.

Clause 48. The method of clause 47 wherein the step of providing a precursor comprises polymerizing (meth)acrylate monomers in the presence of a free-radical initiator and a silane-bearing chain transfer agent (CTA).

Clause 49. The method of clause 48 wherein the mole ratio of CTA to initiator ranges from about 200:1 to about 1:2.

Clause 50. The method of any one of clauses 48-49 wherein the structure of the chain transfer agent (CTA) is

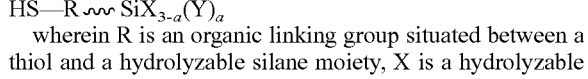

wherein R is an organic linking group situated between a thiol and a hydrolyzable silane moiety, X is a hydrolyzable group, Y is an organofunctional group, and the value of "a" is selected from the group consisting of 0, 1, 2, and combinations thereof.

Clause 51. The method of any one of clauses 48-50 wherein the initiator is activated upon exposure to at least one of heat, actinic radiation, and electron beam radiation.

Clause 52. The method of any one of clauses 48-51 wherein the initiator is activated upon exposure to UV radiation.

Clause 53. The method of any one of clauses 47-52 wherein the hydrolysis and the condensation reactions or only the condensation reaction occurs at one of a temperature range of from about 20° C. to about 50° C. and from about 51° C. to about 170° C.

Clause 54. The method of any one of clauses 47-53 wherein the hydrolysis and the condensation reactions or only the condensation reaction occurs in the presence of a catalyst.

Clause 55. The method of clause 54 wherein the catalyst is in the amount of about 0.5 to about 5% by weight of the precursor.

Clause 56. The method of any one of clauses 47-55 wherein the precursor comprises a macromonomer having the general formula

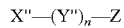

wherein X" is a vinyl group copolymerizable with the other monomers present in the precursor composition; Y" is a divalent linking group where n is 0 or 1; Z is a monovalent polymeric moiety having a $T_g$ greater than 20° C. and a weight average molecular weight in the range of about 2,000 to about 30,000 g/mole.

Clause 57. The method of any one of clauses 47-56 wherein the silsesquioxane core is selected from the group consisting of a pure silsesquioxane core, a hybrid silsesquioxane core, and combinations thereof.

Clause 58. The method of any one of clauses 47-57 wherein the silsesquioxane core is selected from the group consisting of a fully condensed core, a partially condensed core, and combinations thereof.

Clause 59. The method of any one of clauses 47-58 further comprising:
providing a core modifier prior to and/or during the subjecting of the precursor to the hydrolysis and the condensation reactions or only the condensation reaction.

Clause 60. The method of clause 59 wherein the silsesquioxane core comprises a hybrid core having one or more of the Si atoms in the core substituted with atom M of the core modifier, the core modifier having a formula selected from the group consisting of MX, $MX_2$, $MX_3$, $MX_4$, $MX_5$, $MX_6$, RMX, $RMX_2$, $RMX_3$, $RMX_4$, $RMX_5$, and $RMX_6$, in which R is selected from the group consisting of alkyl, alkenyl, aryl, H, and combinations thereof, M is independently selected from Al, Si, Ge, Sn, Ti, and Zr, and X is selected from the group consisting of organic monodentate ligand, organic bidentate ligand, organic tridentate ligand, organic ambidentate ligand, halogen, alkoxide, and combinations thereof.

Clause 61. The method of any one of clauses 59-60 wherein the silsesquioxane core comprises a hybrid core having one or more of the Si atoms in the core substituted with atom M of the core modifier, the core modifier having a formula selected from the group consisting of $M(X)_4$ and $M(X)_a(Z)_b$ in which M is independently selected from Al, Si, Ge, Sn, Ti, and Zr, a is 2, b is 2, X is a hydrolyzable group, Z is an organic ligand of the formula A-C(O)—(R')$_n$—C(O)—B wherein R' is an organic group and n is an integer from 0 to 10, A is an organic group, and B is an organic group.

Clause 62. The method of any one of clauses 59-61 wherein the silsesquioxane core comprises a hybrid core having one or more of the Si atoms in the core substituted with another Si atom of the core modifier, the core modifier having a formula $R''_{4-q}Si(OR\#)_q$, wherein R" is a functional or non-functional hydrocarbon group, R# is selected from the group consisting of methyl, ethyl, and isopropyl, and q is 2 or 3.

Clause 63. The method of any one of clauses 59-62 wherein the silsesquioxane core comprises a hybrid core having one or more of the Si atoms in the core substituted with another Si atom of the core modifier, the core modifier having a formula $Si(OR\#)_4$ in which R# is selected from the group consisting of methyl, ethyl, and isopropyl.

Clause 64. The method of any one of clauses 47-63 wherein the polymer chain comprises polymers selected from the group consisting of compositionally different polymer chains, compositionally the same polymer chains, and combinations thereof.

Clause 65. The method of any one of clauses 47-64 wherein the polymer chain does not contain any ethylenic unsaturation or acrylate unsaturation along the backbone of the polymer chain.

Clause 66. The method of any one of clauses 47-65 wherein the polymer chain comprises (meth)acrylate monomers linked to form polymers selected from the group consisting of linear homopolymers, branched homopolymers, linear copolymers, branched copolymers, and combinations thereof.

Clause 67. The method of any one of clauses 47-66 wherein at least one of the hyperbranched polymer and the polymer comprises at least about 50% by weight of (meth)acrylate monomers.

Clause 68. The method of any one of clauses 47-67 further including the step of adding an oligomer having at least one crosslinkable functional group in addition to the precursor.

Clause 69. The method of clause 68 wherein the oligomer is a liquid at room temperature.

Clause 70. The method of any one of clauses 47-69 wherein the oligomer has a backbone selected from the group consisting of polyether, polyisobutylene, amorphous poly-alpha olefins, polybutadienes, polyisoprenes, polydimethylsiloxanes, polyalkyloxazolines, polyesters, poly(methyl)acrylates, polyurethanes, and combinations thereof.

Clause 71. The method of any one of clauses 47-70 further including the step of adding a tackifier.

Clause 72. The method of clause 71 wherein the tackifier is substantially compatible with the precursor.

Clause 73. The method of any one of clauses 47-72 wherein the silsesquioxane core is a pure silsesquioxane core.

Clause 74. The method of any one of clauses 47-73 wherein the pure silsesquioxane core comprises only fully condensed cores.

Clause 75. The method of any one of clauses 47-73 wherein the pure silsesquioxane core comprises only partially condensed cores.

Clause 76. The method of any one of clauses 47-75 wherein the pure silsesquioxane core comprises a combination of fully condensed cores and partially condensed cores.

Clause 77. The method of any one of clauses 47-72 wherein the silsesquioxane core is a hybrid silsesquioxane core.

Clause 78. The method of any one of clauses 47-72 and 77 wherein the hybrid silsesquioxane core comprises only fully condensed cores.

Clause 79. The method of any one of clauses 47-72 and 77 wherein the hybrid silsesquioxane core comprises only partially condensed cores.

Clause 80. The method of any one of clauses 47-72 and 77 wherein the hybrid silsesquioxane core comprises a combination of fully condensed cores and partially condensed cores.

Clause 81. The method of any one of clauses 47-72 wherein the silsesquioxane core comprises a combination of pure silsesquioxane cores and hybrid silsesquioxane cores.

Clause 82. The method of any one of clauses 47-72 and 81 wherein the combination of pure silsesquioxane and hybrid silsesquioxane cores comprises only fully condensed cores.

Clause 83. The method of any one of clauses 47-72 and 81 wherein the combination of pure silsesquioxane and hybrid silsesquioxane cores comprises only partially condensed cores.

Clause 84. The method of any one of clauses 47-72 and 81 wherein the combination of pure silsesquioxane and hybrid silsesquioxane cores comprises a combination of fully condensed cores and partially condensed cores.

Clause 85. The method of any one of clauses 47-84 wherein the silsesquioxane core comprises Si atoms attached to at least one of three oxo groups and two oxo groups.

Clause 86. The method of any one of clauses 47-85 wherein the silsesquioxane cores have the general formula $[RSiO_{3/2}]_n$ where n is an even number and R is selected from the group consisting of alkyl, aryl, heterocarbon, polymer, oligomer, (meth)acrylate polymer, (meth)acrylate oligomer, and combinations thereof.

Clause 87. The method of any one of clauses 47-86 wherein a majority of silsesquioxane cores have the general formula $[RSiO_{3/2}]_n$, where n is an even number and R is selected from the group consisting of alkyl, aryl, heterocarbon, polymer, oligomer, (meth)acrylate polymer, (meth)acrylate oligomer, and combinations thereof.

Clause 88. The method of any one of clauses 47-85 wherein the silsesquioxane cores have the general formula $[R—SiO_{3/2}]_n(H_2O)_{(3n/2)-x}$ where 'n' is a positive integer, 'x' is a positive integral value less than or equal to 3n/2, and R is selected from the group consisting of alkyl, aryl, heterocarbon, polymer, oligomer, (meth)acrylate polymer, (meth)acrylate oligomer, and combinations thereof.

Clause 89. The method of any one of clauses 47-85 and 88 wherein a majority of silsesquioxane cores have the general formula $[R—SiO_{3/2}]_n(H_2O)_{(3n/2)-x}$ where 'n' is a positive integer, 'x' is a positive integral value less than or equal to 3n/2, and R is selected from the group consisting of alkyl, aryl, heterocarbon, polymer, oligomer, (meth)acrylate polymer, (meth)acrylate oligomer, and combinations thereof.

Clause 90. The method of any one of clauses 57-72 and 77-89 wherein the hybrid silsesquioxane core is a metallo-silsesquioxane core.

Clause 91. The method of any one of clauses 47-90 wherein the silsesquioxane core is in at least one of a caged form, polymeric form, and combinations thereof.

Clause 92. The method of any one of clauses 47-91 further including the step of adding an amount of a polyol during the condensation reaction to serially and covalently link each one of the silsesquioxane cores of a portion of the hyperbranched polymers to another silsesquioxane core to form a pearl chain structure, the polyol having a structure

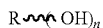

where R is a spacer group situated between the OH groups, and n is selected from the group consisting of 2, 3, 4, and combinations thereof.

Clause 93. The method of clause 92 wherein the polyol is in the amount of about 0 to about 30% by weight of at least one of the hyperbranched polymer and the polymer.

Clause 94. The method of any one of clauses 47-91 further including the step of adding an amount of a hydrolyzable di-silane during the condensation reaction to link each one of the silsesquioxane cores of a portion of the hyperbranched polymers to other one or more silsesquioxane cores to form a multidimensional network structure, the hydrolyzable di-silane having a structure

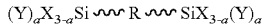

where R is an organic group situated between the two hydrolyzable silane moieties, X is a hydrolyzable group, Y is an organofunctional group, and each 'a' is independently selected from 0, 1, and 2.

Clause 95. The method of clause 94 wherein the multidimensional network is a two dimensional structure.

Clause 96. The method of any one of clauses 94-95 wherein the hydrolyzable di-silane is in the amount of about 0 to about 30% by weight of at least one of the hyperbranched polymer and the polymer.

Clause 97. The method of any one of clauses 47-96 wherein X is selected from the group consisting of halogen, acyloxy, ketoximate, alkoxy, and combinations thereof.

Clause 98. The method of any one of clauses 47-97 wherein X is an alkoxy group.

Clause 99. The method of any one of clauses 47-98 wherein the value of 'a' is 0.

Clause 100. The method of any one of clauses 47-99 wherein the number average molecular weight (Mn) of the precursor is within a range of from about 2,000 to about 300,000 g/mole.

Clause 101. The method of any one of clauses 47-100 wherein the number average molecular weight (Mn) of the polymer is within a range of from about 20,000 to about 1,000,000 g/mole.

Clause 102. The method of any one of clauses 47-101 wherein the precursor is synthesized in one of a solvent medium and a solvent-free medium.

Clause 103. The method of any one of clauses 47-102 wherein the polymer is free of crosslinking.

Clause 104. The method of any one of clauses 47-103 wherein the polymer exhibits a glass transition temperature (Tg) of from about 10° C. to about −60° C. as determined by differential scanning calorimetry (DSC).

Clause 105. The method of any one of clauses 47-104 wherein the polymer exhibits a plateau shear modulus at 25° C. and 1 radian per second that is between $5 \times 10^4$ and $6 \times 10^6$ dynes/cm$^2$ as determined by dynamic mechanical analysis (DMA).

Clause 106. A pressure sensitive adhesive comprising the polymer formed from the method of any one of clauses 47-105.

Clause 107. A pressure sensitive adhesive comprising a hyperbranched polymer, the hyperbranched polymer comprising at least one silsesquioxane core and at least two polymer chains chemically bound to each of said silsesquioxane core, wherein at least one of the hyperbranched polymer and the pressure sensitive adhesive comprises at least about 50% by weight of (meth)acrylate monomers.

Clause 108. The pressure sensitive adhesive of clause 107 wherein the polymer is free of crosslinking Clause 109. A pressure sensitive adhesive consisting of a hyperbranched polymer, the hyperbranched polymer having at least one silsesquioxane core and at least two polymer chains chemically bound to each of said silsesquioxane core, wherein at least one of the hyperbranched polymer and the pressure sensitive adhesive comprises at least about 50% by weight of (meth)acrylate monomers.

Clause 110. The pressure sensitive adhesive of clause 109 wherein the polymer is free of crosslinking.

The features, structures, or characteristics of the invention described throughout this specification may be combined in any suitable manner in one or more aspects. For example, reference throughout this specification to "certain aspects," "some aspects," or similar language means that a particular feature, structure, or characteristic described in connection with the aspect is included in at least one aspect of the present invention. Thus, appearances of the phrases "in certain aspects," "in some aspect," "in other aspects," or similar language throughout this specification do not necessarily all refer to the same group of aspects and the described features, structures, or characteristics may be combined in any suitable manner in one or more aspects.

As described hereinabove, the present subject matter solves many problems associated with previous strategies, systems and/or devices. However, it will be appreciated that various changes in the details, materials and arrangements of components and/or operations, which have been herein described and illustrated in order to explain the nature of the present subject matter, may be made by those skilled in the art without departing from the principle and scope of the claimed subject matter, as expressed in the appended claims.

What is claimed is:

1. A polymer comprising one or more hyperbranched polymers,
   the hyperbranched polymer exhibiting a core-shell structure comprising at least one silsesquioxane core and at least two polymer chains chemically bound to each of said silsesquioxane core, the shell comprising the at least two polymer chains,
   wherein the at least two polymer chains originate from one silsesquioxane core to form one hyperbranched polymer such that one end of each polymer chain is chemically bound to the silsesquioxane core while allowing the other end of the chain to dangle freely,
   wherein the hyperbranched polymer is a discrete molecule, wherein the hyperbranched polymer is formed by a hydrolyzable and condensable precursor or only a condensable precursor, the precursor having a formula:

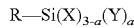

wherein R is one of a nonhydrolyzable organic group, a nonhydrolyzable oligomer chain, and a nonhydrolyzable polymer chain, X is a hydrolyzable group, Y is an organofunctional group, and the value of "a" is selected from the group consisting of 0, 1, 2, and combinations thereof,
wherein X is selected from the group consisting of halogen, acyloxy, ketoximate, alkoxy, and combinations thereof,
wherein the polymer chains do not contain any ethylenic unsaturation or acrylate unsaturation along the backbone of the polymer chains, and
wherein the molecular weight distribution (Mw/Mn) of the precursor is within a range of from 2.8 to 5.1.

2. The polymer of claim 1 wherein the silsesquioxane core is selected from the group consisting of a pure silsesquioxane core, a hybrid silsesquioxane core, and combinations thereof.

3. The polymer of claim 1 wherein the silsesquioxane core is selected from the group consisting of a fully condensed core, a partially condensed core, and combinations thereof.

4. The polymer of claim 1 wherein the silsesquioxane core comprises a hybrid core selected from the group consisting of:
(i) a hybrid core having one or more of the Si atoms in the core substituted with atom M of a core modifier, the core modifier having a formula selected from the group consisting of MX, $MX_2$, $MX_3$, $MX_4$, $MX_5$, $MX_6$, RMX, $RMX_2$, $RMX_3$, $RMX_4$, $RMX_5$, and $RMX_6$, in which R is selected from the group consisting of alkyl, alkenyl, aryl, H, and combinations thereof, M is independently selected from Al, Si, Ge, Sn, Ti, and Zr, and X is selected from the group consisting of organic monodentate ligand, organic bidentate ligand, organic tridentate ligand, organic ambidentate ligand, halogen, alkoxide, and combinations thereof;
(ii) a hybrid core having one or more of the Si atoms in the core substituted with atom M of a core modifier, the core modifier having a formula selected from the group consisting of $M(X)_4$ and $M(X)_a(Z)_b$ in which M is independently selected from Al, Si, Ge, Sn, Ti, and Zr, a is 2, b is 2, X is a hydrolyzable group, Z is an organic ligand of the formula A-C(O)—(R')$_n$—C(O)—B wherein R' is an organic group and n is an integer from 0 to 10, A is an organic group, and B is an organic group;
(iii) a hybrid core having one or more of the Si atoms in the core substituted with another Si atom of a core modifier, the core modifier having a formula R"$_{4-q}$Si(OR#)$_q$ wherein R" is a functional or non-functional hydrocarbon group, R# is selected from the group consisting of methyl, ethyl, and isopropyl, and q is 2 or 3; and
(iv) a hybrid core having one or more of the Si atoms in the core substituted with another Si atom of a core modifier, the core modifier having a formula Si(OR#)$_4$ in which R# is selected from the group consisting of methyl, ethyl, and isopropyl.

5. The polymer of claim 1 wherein each of the polymer chains comprises polymers selected from the group consisting of compositionally different polymer chains, compositionally the same polymer chains, and combinations thereof.

6. The polymer of claim 1 wherein the polymer chain comprises (meth)acrylate monomers linked to form polymers selected from the group consisting of linear homopolymers, branched homopolymers, linear copolymers, branched copolymers, and combinations thereof.

7. The polymer of claim 1 wherein at least one of the hyperbranched polymer and the polymer comprises at least about 50% by weight of (meth)acrylate monomers.

8. The polymer of claim 1 further comprising an oligomer having at least one crosslinkable functional group, wherein the oligomer is a liquid at room temperature.

9. The polymer of claim 8 wherein the oligomer has a backbone selected from the group consisting of polyether, polyisobutylene, amorphous poly-alpha olefins, polybutadienes, polyisoprenes, polydimethylsiloxanes, polyalkyloxazolines, polyesters, poly(methyl)acrylates, polyurethanes, and combinations thereof.

10. The polymer of claim 1 further including a tackifier.

11. The polymer of claim 1 wherein the silsesquioxane core is a pure silsesquioxane core.

12. The polymer of claim 11 wherein the pure silsesquioxane core comprises only fully condensed cores.

13. The polymer of claim 11 wherein the pure silsesquioxane core comprises only partially condensed cores.

14. The polymer of claim 11 wherein the pure silsesquioxane core comprises a combination of fully condensed cores and partially condensed cores.

15. The polymer of claim 1 wherein the silsesquioxane core is a hybrid silsesquioxane core.

16. The polymer of claim 15 wherein the hybrid silsesquioxane core comprises only fully condensed cores.

17. The polymer of claim 15 wherein the hybrid silsesquioxane core comprises only partially condensed cores.

18. The polymer of claim 15 wherein the hybrid silsesquioxane core comprises a combination of fully condensed cores and partially condensed cores.

19. The polymer of claim 1 wherein the silsesquioxane core comprises a combination of pure silsesquioxane cores and hybrid silsesquioxane cores.

20. The polymer of claim 19 wherein the combination of pure silsesquioxane and hybrid silsesquioxane cores comprises only fully condensed cores.

21. The polymer of claim 19 wherein the combination of pure silsesquioxane and hybrid silsesquioxane cores comprises only partially condensed cores.

22. The polymer of claim 19 wherein the combination of pure silsesquioxane and hybrid silsesquioxane cores comprises a combination of fully condensed cores and partially condensed cores.

23. The polymer of claim 3 wherein the fully condensed silsesquioxane cores have the general formula [RSiO$_{3/2}$]$_n$ where n is an even number and R is selected from the group consisting of alkyl, aryl, heterocarbon, polymer, oligomer, (meth)acrylate polymer, (meth)acrylate oligomer, and combinations thereof.

24. The polymer of claim 1 wherein each one of the silsesquioxane cores of a portion of the hyperbranched polymers is serially and covalently linked to another silsesquioxane core to form a pearl chain structure,
wherein the link comprises a polyol having a structure

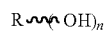

where R is a spacer group situated between the OH groups, and n is selected from the group consisting of 2, 3, 4, and combinations thereof.

25. The polymer of claim 1 wherein each one of the silsesquioxane cores of a portion of the hyperbranched polymers is covalently linked to other one or more silsesquioxane cores to form a multidimensional network structure,
wherein the link comprises a hydrolyzable di-silane having a structure

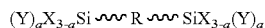

where R is an organic group situated between the two hydrolyzable silane moieties, X is a hydrolyzable group, Y is an organofunctional group, and each 'a' is independently selected from 0, 1, and 2, and
wherein the multidimensional network is a two dimensional structure.

26. The polymer of claim 1 wherein the polymer exhibits a glass transition temperature (Tg) of from about 10° C. to about −60° C. as determined by differential scanning calorimetry (DSC).

27. An article comprising a pressure sensitive adhesive of claim 13, the article further comprising a substrate defining a face;
wherein the pressure sensitive adhesive is disposed on at least a portion of the face of the substrate.

28. A method of forming a pressure sensitive adhesive comprising the steps of:
providing the precursor of claim 1:
subjecting the precursor to a hydrolysis and a condensation reaction or only a condensation reaction to thereby form a hyperbranched polymer, the hyperbranched polymer exhibiting a core-shell structure comprising at least one silsesquioxane core and at least two polymer chains chemically bound to each of said silsesquioxane core, the shell comprising the at least two polymer chains,
wherein the at least two polymer chains originate from one silsesquioxane core to form one hyperbranched polymer such that one end of each polymer chain is chemically bound to the silsesquioxane core while allowing the other end of the chain to dangle freely,
wherein the hyperbranched polymer is a discrete molecule, and
wherein the polymer chains do not contain any ethylenic unsaturation or acrylate unsaturation along the backbone of the polymer chains.

29. The method of claim 28 wherein the step of providing a precursor comprises polymerizing (meth)acrylate monomers in the presence of a free-radical initiator and a silane-bearing chain transfer agent (CTA),
wherein the mole ratio of CTA to initiator ranges from about 200:1 to about 1:2,
wherein the structure of the chain transfer agent (CTA) is

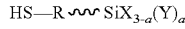

wherein R is an organic linking group situated between a thiol and a hydrolyzable silane moiety, X is a hydrolyzable group, Y is an organofunctional group, and the value of "a" is selected from the group consisting of 0, 1, 2, and combinations thereof, and
wherein X is selected from the group consisting of halogen, acyloxy, ketoximate, alkoxy, and combinations thereof.

30. The method of claim 29 wherein the initiator is activated upon exposure to at least one of heat, actinic radiation, and electron beam radiation.

31. The method of claim 28 wherein the hydrolysis and the condensation reactions or only the condensation reaction occurs at one of a temperature range of from about 20° C. to about 50° C. and from about 51° C. to about 170° C.,
wherein the hydrolysis and the condensation reactions or only the condensation reaction occurs in the presence of a catalyst, and
wherein the catalyst is in the amount of about 0.5 to about 5% by weight of the precursor.

32. The method of claim 28 further comprising:
providing a core modifier prior to and/or during the subjecting of the precursor to the hydrolysis and the condensation reactions or only the condensation reaction.

33. The method of claim 28 further including the step of adding a tackifier, wherein the tackifier is substantially compatible with the precursor.

34. The method of claim 28 further including the step of adding an amount of a polyol during the condensation reaction to serially and covalently link each one of the silsesquioxane cores of a portion of the hyperbranched polymers to another silsesquioxane core to form a pearl chain structure, the polyol having a structure

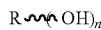

where R is a spacer group situated between the OH groups, and n is selected from the group consisting of 2, 3, 4, and combinations thereof,
wherein the polyol is in the amount of about 0 to about 30% by weight of at least one of the hyperbranched polymer and the polymer.

35. The method of claim 28 further including the step of adding an amount of a hydrolyzable di-silane during the condensation reaction to link each one of the silsesquioxane cores of a portion of the hyperbranched polymers to other one or more silsesquioxane cores to form a multidimensional network structure, the hydrolyzable di-silane having a structure

where R is an organic group situated between the two hydrolyzable silane moieties, X is a hydrolyzable group, Y is an organofunctional group, and each 'a' is independently selected from 0, 1, and 2,
wherein the hydrolyzable di-silane is in the amount of about 0 to about 30% by weight of at least one of the hyperbranched polymer and the polymer,
wherein X is selected from the group consisting of halogen, acyloxy, ketoximate, alkoxy, and combinations thereof, and
wherein the multidimensional network is a two dimensional structure.

36. The polymer of claim 1 wherein at least one of the hyperbranched polymer and the polymer comprises greater than 50% by weight of (meth)acrylate monomers.

37. The polymer of claim 1 wherein at least one of the hyperbranched polymer and the polymer comprises from about 60% to about 99.99% by weight of (meth)acrylate monomers.

38. A pressure sensitive adhesive comprising one or more hyperbranched polymers,
the hyperbranched polymer exhibiting a core-shell structure comprising at least one silsesquioxane core and at least two polymer chains chemically bound to each of said silsesquioxane core, the shell comprising the at least two polymer chains,
wherein the at least two polymer chains originate from one silsesquioxane core to form one hyperbranched polymer such that one end of each polymer chain is chemically bound to the silsesquioxane core while allowing the other end of the chain to dangle freely,
wherein the hyperbranched polymer is a discrete molecule,
wherein the hyperbranched polymer is formed by a hydrolyzable and condensable precursor or only a condensable precursor, the precursor having a formula:

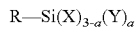

wherein R is one of a nonhydrolyzable organic group, a nonhydrolyzable oligomer chain, and a nonhydrolyzable polymer chain, X is a hydrolyzable group, Y is an organofunctional group, and the value of "a" is selected from the group consisting of 0, 1, 2, and combinations thereof,
wherein X is selected from the group consisting of halogen, acyloxy, ketoximate, alkoxy, and combinations thereof,
wherein the number average molecular weight (Mn) of the precursor is within a range of from 2,000 to 300,000 g/mole determined by gel permeation chromatography,
wherein the polymer chains do not contain any ethylenic unsaturation or acrylate unsaturation along the backbone of the polymer chains,
wherein the polymer exhibits a plateau shear modulus at 25° C. and 1 radian per second that is between $5 \times 10^4$ and $6 \times 10^6$ dynes/cm$^2$ as determined by dynamic mechanical analysis (DMA), and
wherein the molecular weight distribution (Mw/Mn) of the precursor is within a range of from 2.8 to 5.1.

39. A polymer comprising one or more hyperbranched polymers,
the hyperbranched polymer exhibiting a core-shell structure comprising at least one silsesquioxane core and at least two polymer chains chemically bound to each of said silsesquioxane core, the shell comprising the at least two polymer chains,
wherein the at least two polymer chains originate from one silsesquioxane core to form one discrete hyperbranched polymer such that one end of each polymer chain is chemically bound to the silsesquioxane core while allowing the other end of the chain to dangle freely,
wherein the hyperbranched polymer is a discrete molecule,
wherein the hyperbranched polymer is formed by a hydrolyzable and condensable precursor or only a condensable precursor, the precursor having a formula:

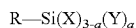

wherein R is one of a nonhydrolyzable organic group, a nonhydrolyzable oligomer chain, and a nonhydrolyzable polymer chain, X is a hydrolyzable group, Y is an organofunctional group, and the value of "a" is selected from the group consisting of 0, 1, 2, and combinations thereof,
wherein X is selected from the group consisting of halogen, acyloxy, ketoximate, alkoxy, and combinations thereof,
wherein the polymer chains do not contain any ethylenic unsaturation or acrylate unsaturation along the backbone of the polymer chains,
wherein the number average molecular weight (Mn) of the precursor is within a range of from 2,000 to 300,000 g/mole determined by gel permeation chromatography,$
wherein the polymer exhibits a glass transition temperature (Tg) of from about 10° C. to about −60° C. as determined by differential scanning calorimetry (DSC), and
wherein the molecular weight distribution (Mw/Mn) of the precursor is within a range of from 2.8 to 5.1.

40. The polymer of claim 39 wherein the polymer is a pressure sensitive adhesive.

41. The polymer of claim 1 wherein the number average molecular weight (Mn) of the precursor is within a range of from 2,000 to 300,000 g/mole determined by gel permeation chromatography.

42. The polymer of claim 1 wherein the polymer exhibits a plateau shear modulus at 25° C. and 1 radian per second that is between $5 \times 10^4$ and $6 \times 10^6$ dynes/cm$^2$ as determined by dynamic mechanical analysis (DMA).

43. The polymer of claim 1 wherein the polymer is a pressure sensitive adhesive.

44. The polymer of claim 1 wherein the silsesquioxane core comprises a hybrid core selected from the group consisting of:
(i) a hybrid core having one or more of the Si atoms in the core substituted with atom M of a core modifier, the core modifier having a formula selected from the group consisting of MX, MX$_2$, MX$_3$, MX$_4$, MX$_5$, MX$_6$, RMX, RMX$_2$, RMX$_3$, RMX$_4$, RMX$_5$, and RMX$_6$, in which R is selected from the group consisting of alkyl, alkenyl, aryl, H, and combinations thereof, M is independently selected from Al, Ge, Sn, Ti, and Zr, and X is selected from the group consisting of organic monodentate ligand, organic bidentate ligand, organic tridentate ligand, organic ambidentate ligand, halogen, alkoxide, and combinations thereof; and
(ii) a hybrid core having one or more of the Si atoms in the core substituted with atom M of a core modifier, the core modifier having a formula selected from the group consisting of M(X)$_4$ and M(X)$_a$(Z)$_b$ in which M is independently selected from Al, Ge, Sn, Ti, and Zr, a is 2, b is 2, X is a hydrolyzable group, Z is an organic ligand of the formula A-C(O)—(R')$_n$—C(O)—B wherein R' is an organic group and n is an integer from 0 to 10, A is an organic group, and B is an organic group.

45. The polymer of claim 1 wherein the silsesquioxane core is a structure in which each ring-member silicon atom is linked to three other ring-member silicon atoms through oxygen atoms and/or a structure in which at least one silicon atom is linked to no more than two other ring-member silicon atoms through oxygen atoms.

46. The pressure sensitive adhesive of claim 38 wherein the silsesquioxane core is a structure in which each ring-member silicon atom is linked to three other ring-member silicon atoms through oxygen atoms and/or a structure in which at least one silicon atom is linked to no more than two other ring-member silicon atoms through oxygen atoms.

47. The polymer of claim 39 wherein the silsesquioxane core is a structure in which each ring-member silicon atom is linked to three other ring-member silicon atoms through oxygen atoms and/or a structure in which at least one silicon atom is linked to no more than two other ring-member silicon atoms through oxygen atoms.

48. The polymer of claim 1 wherein the silsesquioxane core is a two and/or three dimensional structure.

49. The pressure sensitive adhesive of claim 38 wherein the silsesquioxane core is a two and/or three dimensional structure.

50. The polymer of claim 39 wherein the silsesquioxane core is a two and/or three dimensional structure.

51. The polymer of claim 1 wherein the silsesquioxane core is in at least one of a caged form, polymeric form, and combinations thereof.

52. The pressure sensitive adhesive of claim 38 wherein the silsesquioxane core is in at least one of a caged form, polymeric form, and combinations thereof.

53. The polymer of claim 39 wherein the silsesquioxane core is in at least one of a caged form, polymeric form, and combinations thereof.

54. The polymer of claim 1 wherein the number average molecular weight (Mn) of the precursor is within a range of from 59,495 to 300,000 g/mole determined by gel permeation chromatography.

55. The pressure sensitive adhesive of claim 38 wherein the number average molecular weight (Mn) of the precursor is within a range of from 59,495 to 300,000 g/mole determined by gel permeation chromatography.

56. The polymer of claim 39 wherein the number average molecular weight (Mn) of the precursor is within a range of from 59,495 to 300,000 g/mole determined by gel permeation chromatography.

57. The polymer of claim 1 wherein the polymer chain does not contain reactive groups that can facilitate crosslinking using triggers selected from the group consisting of heat, moisture, ultraviolet, and electron beam.

58. The pressure sensitive adhesive of claim 38 wherein the polymer chain does not contain reactive groups that can facilitate crosslinking by triggers selected from the group consisting of heat, moisture, ultraviolet, and electron beam.

59. The polymer of claim 39 wherein the polymer chain does not contain reactive groups that can facilitate crosslinking using triggers selected from the group consisting of heat, moisture, ultraviolet, and electron beam.

60. The polymer of claim 1 wherein the number average molecular weight (Mn) of the precursor is within a range of from 30,078 to 88,024 g/mole determined by gel permeation chromatography.

61. The pressure sensitive adhesive of claim 38 wherein the number average molecular weight (Mn) of the precursor is within a range of from 30,078 to 88,024 g/mole determined by gel permeation chromatography.

62. The polymer of claim 39 wherein the number average molecular weight (Mn) of the precursor is within a range of from 30,078 to 88,024 g/mole determined by gel permeation chromatography.

63. The pressure sensitive adhesive of claim 38 wherein the polymer chain comprises (meth)acrylate monomers linked to form polymers selected from the group consisting of linear homopolymers, branched homopolymers, linear copolymers, branched copolymers, and combinations thereof.

64. The pressure sensitive adhesive of claim 38 wherein at least one of the hyperbranched polymer and the pressure sensitive adhesive comprises at least about 50% by weight of (meth)acrylate monomers.

65. The polymer of claim 39 wherein the polymer chain comprises (meth)acrylate monomers linked to form polymers selected from the group consisting of linear homopolymers, branched homopolymers, linear copolymers, branched copolymers, and combinations thereof.

66. The polymer of claim 39 wherein at least one of the hyperbranched polymer and the polymer comprises at least about 50% by weight of (meth)acrylate monomers.

67. The polymer of claim 1 wherein the polymer chains consist of (meth) acrylate polymer chains.

68. The pressure sensitive adhesive of claim 38 wherein the polymer chains consist of (meth) acrylate polymer chains.

69. The polymer of claim 39 wherein the polymer chains consist of (meth) acrylate polymer chains.

70. The pressure sensitive adhesive of claim 38 wherein the number average molecular weight (Mn) of the pressure sensitive adhesive is within a range of from 20,000 to 1,000,000 g/mole determined by gel permeation chromatography.

71. The pressure sensitive adhesive of claim 38 wherein the number average molecular weight (Mn) of the pressure sensitive adhesive is within a range of from 30,000 to 500,000 g/mole determined by gel permeation chromatography.

72. The polymer of claim 1 wherein the precursor is hydrolyzable and condensable or only condensable at one of a temperature range of from about 20° C. to about 50° C. and from about 51° C. to about 170° C.

73. The polymer of claim 1 wherein the polymer chains are free of crosslinking.

74. The pressure sensitive adhesive of claim 38 wherein the polymer chains are free of crosslinking.

75. The polymer of claim 39 wherein the polymer chains are free of crosslinking.

\* \* \* \* \*